US011101967B2

(12) United States Patent
Sun et al.

(10) Patent No.: US 11,101,967 B2
(45) Date of Patent: Aug. 24, 2021

(54) TECHNIQUES FOR CONTROL RESOURCE SET (CORESET) CONFIGURATION FOR SHARED RADIO FREQUENCY SPECTRUM

(71) Applicant: QUALCOMM Incorporated, San Diego, CA (US)

(72) Inventors: Jing Sun, San Diego, CA (US); Huilin Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/793,836

(22) Filed: Feb. 18, 2020

(65) Prior Publication Data

US 2020/0274682 A1     Aug. 27, 2020

Related U.S. Application Data

(60) Provisional application No. 62/808,732, filed on Feb. 21, 2019.

(51) Int. Cl.
*H04W 24/10*     (2009.01)
*H04W 76/27*     (2018.01)
(Continued)

(52) U.S. Cl.
CPC ........ *H04L 5/0094* (2013.01); *H04J 11/0073* (2013.01); *H04J 11/0076* (2013.01);
(Continued)

(58) Field of Classification Search
CPC ............. H04W 72/0446; H04W 45/12; H04W 72/042; H04W 72/0453; H04L 5/0073; H04L 5/001; H04L 1/1614
(Continued)

(56) References Cited

U.S. PATENT DOCUMENTS

2007/0274288 A1* 11/2007 Smith ................... H04L 5/0092
                                                              370/351
2013/0188558 A1*  7/2013 Nam ..................... H04W 48/12
                                                              370/328

(Continued)

FOREIGN PATENT DOCUMENTS

WO          2019216430 A1     11/2019

OTHER PUBLICATIONS

Huawei, et al., "DL Channels and Signals in NR Unlicensed Band", 3GPP Draft, R1-1808059, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515463, 5 pages, Retrieved from the Internet: URL: http://www.3gpp.org/ftp/tsg%5Fran/WG1%5FRL1/TSGR1%5F94/Docs/R1%2D1808059%2Ezip. [retrieved on Aug. 10, 2018] Section 3; p. fourth; figure 2.

(Continued)

*Primary Examiner* — Syed Ali
*Assistant Examiner* — Jason A Harley
(74) *Attorney, Agent, or Firm* — Dalei Dong; Harrity & Harrity LLP

(57) ABSTRACT

Various aspects of the present disclosure generally relate to wireless communication. In some aspects, a user equipment (UE) may receive an indication of a configuration for a control resource set (CORESET) of a shared radio frequency spectrum carrier. The UE may identify a bitmap included in the configuration. Each bit in the bitmap may be associated with a respective control resource block group. The UE may identify, based at least in part on a value for each bit in the bitmap, one or more control resource block groups that are included in the CORESET. The UE may monitor for down- (Continued)

link communications in the one or more control resource block groups. Numerous other aspects are provided.

30 Claims, 12 Drawing Sheets

(51) Int. Cl.
| | |
|---|---|
| *H04W 48/12* | (2009.01) |
| *H04L 5/00* | (2006.01) |
| *H04W 72/12* | (2009.01) |
| *H04J 11/00* | (2006.01) |
| *H04W 74/08* | (2009.01) |
| *H04W 16/14* | (2009.01) |

(52) U.S. Cl.
CPC ........ *H04J 11/0079* (2013.01); *H04L 5/0007* (2013.01); *H04W 16/14* (2013.01); *H04W 72/1289* (2013.01); *H04W 74/0833* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0294366 A1* | 11/2013 | Papasakellariou | ...... | H04L 5/005 370/329 |
| 2014/0233466 A1* | 8/2014 | Pourahmadi | ........ | H04L 27/2613 370/329 |
| 2016/0036617 A1* | 2/2016 | Luo | .................... | H04W 56/0015 375/260 |
| 2016/0270059 A1* | 9/2016 | Chen | ..................... | H04L 5/0051 |
| 2018/0279289 A1* | 9/2018 | Islam | ..................... | H04L 5/0094 |
| 2019/0150121 A1* | 5/2019 | Abdoli | ................. | H04L 27/2613 370/329 |
| 2020/0153581 A1* | 5/2020 | Tsai | ..................... | H04L 27/2602 |

OTHER PUBLICATIONS

International Search Report and Written Opinion—PCT/US2020/018814—ISA/EPO—dated Jun. 4, 2020.

Mediatek Inc: "On Initial Access Signals and Channels for NR-U", 3GPP Draft, R1-1901795, On Initial Access Signals and Channels for NR-U Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599489, 6 pages, Retrieved from the Internet: URL: http://www.3gpp.org/ftp/tsg%5Fran/WG1%5FRL1/TSGR1%5F96/Docs/R1%2D1901795%2Ezip. [retrieved on Feb. 16, 2019], Section 2.1; p. first-p. second; table 1.

Nokia, et al., "On Wideband Operation in NR-U", 3GPP Draft, R1-1902437, WB Operation NOK, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600133, 11 pages, Retrieved from the Internet: URL: http://www.3gpp.org/ftp/tsg%5Fran/WG1%5FRL1/TSGR1%5F96/Docs/R1%2D1902437%2Ezip. [retrieved on Feb. 15, 2019] CO RESET configuration, p. third; figure 2.

Vivo: "Remaining Issues on Wideband Operation in NRU", 3GPP Draft, R1-2000313, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852802, 3 pages, Retrieved from the Internet: URL: https://ftp.3gpp.org/tsg_ran/WG1_RL1/TSGR1_100_e/Docs/R1-2000313.zip. R1-2000313RemaTning issues on wideband operation in NRU.docx [retrieved on Feb. 14, 2020] the whole document.

Huawei, et al., "NRU Wideband BWP Operation", R1-1910049, 3GPP TSG RAN WG1 Meeting #98bis, Chongqing, China, Oct. 14-20, 2019, 10 Pages.

Sharp: "Wideband Operation for NR-U", R1-1912767, 3GPP TSG RAN WG1 Meeting #99, Reno, USA, Nov. 18-22, 2019, pp. 1-5.

\* cited by examiner

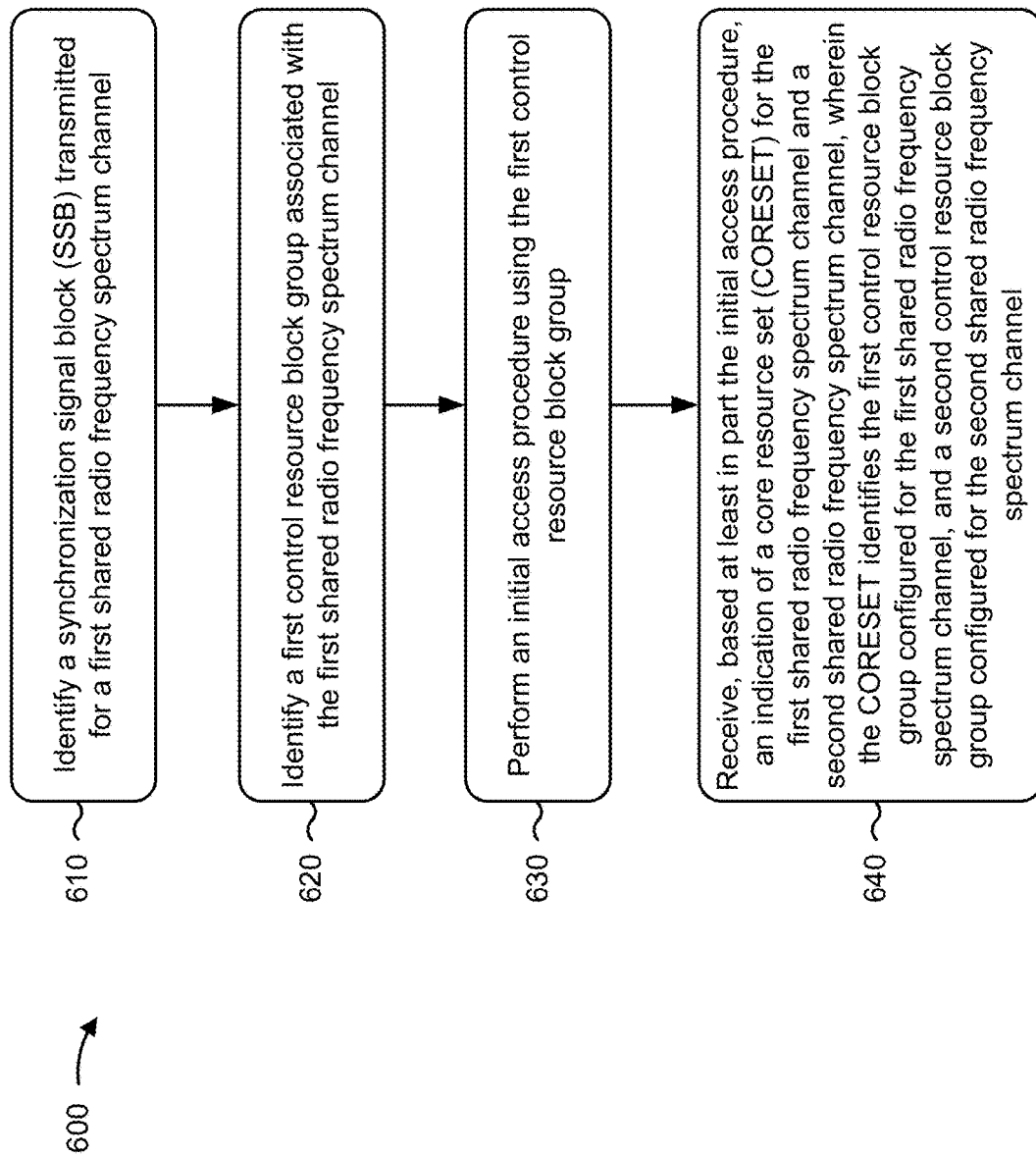

TECHNIQUES FOR CONTROL RESOURCE SET (CORESET) CONFIGURATION FOR SHARED RADIO FREQUENCY SPECTRUM

CROSS-REFERENCE TO RELATED APPLICATION

This application claims priority to U.S. Provisional Application No. 62/808,732, filed on Feb. 21, 2019, entitled "TECHNIQUES FOR CORE RESOURCE SET (CORESET) CONFIGURATION FOR SHARED RADIO FREQUENCY SPECTRUM," which is hereby expressly incorporated by reference herein.

FIELD OF THE DISCLOSURE

Aspects of the present disclosure generally relate to wireless communication, and more particularly to techniques and apparatuses for control resource set (CORESET) configuration for shared radio frequency spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of a configuration for a control resource set (CORESET) of a shared radio frequency spectrum carrier; identifying a bitmap included in the configuration, wherein each bit in the bitmap is associated with a respective control resource block group; identifying, based at least in part on a value for each bit in the bitmap, one or more control resource block groups that are included in the CORESET; and monitoring for downlink communications in the one or more control resource block groups.

In some aspects, the UE is configured with information identifying a number of resource blocks included in each respective control resource block group. In some aspects, the UE is configured with information identifying, for each respective control resource block group, a respective starting resource block within an associated shared radio frequency spectrum bandwidth and a respective ending resource block within the associated shared radio frequency spectrum bandwidth. In some aspects, a control resource block group of the one or more control resource block groups is positioned off-center in an associated shared radio frequency spectrum bandwidth relative to a center frequency of the shared radio frequency spectrum bandwidth.

In some aspects, the indication of the configuration is included in at least one of a radio resource control (RRC) communication, a medium access control control element (MAC-CE) communication, or a downlink control information (DCI) communication. In some aspects, the method further comprises receiving a physical downlink control channel (PDCCH) communication in the CORESET based at least in part on monitoring for downlink communications in the one or more control resource block groups.

In some aspects, the method further comprises identifying a synchronization signal block (SSB) transmitted for a first shared radio frequency spectrum bandwidth of the shared radio frequency spectrum carrier; identifying an initial control resource block group associated with the first shared radio frequency spectrum bandwidth; performing an initial access procedure using the initial control resource block group; and receiving, based at least in part on the initial access procedure, the indication of the configuration for the CORESET. In some aspects, performing the initial access procedure using the initial control resource block group comprises receiving a PDCCH communication in the initial control resource block group during initial access procedure.

In some aspects, the method further comprises receiving a first demodulation reference signal (DMRS) in the initial control resource block group, wherein the first DMRS is scrambled based at least in part on a first DMRS scrambling sequence associated with the first shared radio frequency spectrum bandwidth, and receiving a second DMRS in a control resource block group of the one or more control resource block groups based at least in part on monitoring for downlink communications in the one or more control resource block groups, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with a BS that transmitted the indication of the configuration for the CORESET, a timing of a transmission of the first DMRS, and a channel identifier associated with the first shared radio frequency spectrum bandwidth; and wherein the second DMRS scrambling sequence is based at least in part on the cell identifier associated with the BS, a timing of a transmission of the second DMRS, and a channel identifier associated with the second shared radio frequency spectrum bandwidth.

In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a method of wireless communication, performed by a base station (BS), may include transmitting an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET; and transmitting a downlink communication in a control resource block group of the one or more control resource block groups.

In some aspects, the BS is configured with information identifying a number of resource blocks included in each of the one or more control resource block groups. In some aspects, the BS is configured with information identifying, for each of the control resource block groups, a respective starting resource block within an associated shared radio frequency spectrum bandwidth and a respective ending resource block within the associated shared radio frequency spectrum bandwidth. In some aspects, the control resource block group is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the method further comprises transmitting an SSB for a first shared radio frequency spectrum bandwidth; and performing the initial access procedure using an initial control resource block group in the first shared radio frequency spectrum bandwidth, wherein performing the initial access procedure using the first control resource block group comprises transmitting a physical downlink control channel (PDCCH) communication in the initial control resource block group during initial access procedure. In some aspects, the method further comprises transmitting a first DMRS in the initial control resource block group, wherein the first DMRS is scrambled based at least in part on a first DMRS scrambling sequence associated with the first shared radio frequency spectrum channel, and transmitting a second DMRS in the control resource block group, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with the BS, a timing of the transmission of the first DMRS, and a channel identifier associated with the first shared radio frequency spectrum bandwidth; and wherein the second DMRS scrambling sequence is based at least in part on the cell identifier associated with the BS, a timing of the transmission of the second DMRS, and a channel identifier associated with the second shared radio frequency spectrum bandwidth. In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a UE for wireless communication may include a memory and one or more processors operatively coupled to the memory. The memory and the one or more processors may be configured to receive an indication of a configuration for a CORESET of a shared radio frequency spectrum carrier; identify a bitmap included in the configuration, wherein each bit in the bitmap is associated with a respective control resource block group; identify, based at least in part on a value for each bit in the bitmap, one or more control resource block groups that are included in the CORESET; and monitor for downlink communications in the one or more control resource block groups.

In some aspects, the UE is configured with information identifying a number of resource blocks included in each respective control resource block group. In some aspects, the UE is configured with information identifying, for each respective control resource block group, a respective starting resource block within an associated shared radio frequency spectrum bandwidth and a respective ending resource block within the associated shared radio frequency spectrum bandwidth. In some aspects, a control resource block group of the one or more control resource block groups is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the one or more processors are further configured to receive a PDCCH communication in the CORESET based at least in part on monitoring for downlink communications in the one or more control resource block groups.

In some aspects, the one or more processors are further configured to identify an SSB transmitted for a first shared radio frequency spectrum bandwidth of the shared radio frequency spectrum carrier; identify an initial control resource block group associated with the first shared radio frequency spectrum bandwidth; perform an initial access procedure using the initial control resource block group; and receive, based at least in part on the initial access procedure, the indication of the configuration for the CORESET. In some aspects, performing the initial access procedure using the initial control resource block group comprises receiving a PDCCH communication in the initial control resource block group during initial access procedure.

In some aspects, the one or more processors are further configured to receive a first DMRS in the initial control resource block group, wherein the first DMRS is scrambled based at least in part on a first DMRS scrambling sequence associated with the first shared radio frequency spectrum bandwidth, and receive a second DMRS in a control resource block group of the one or more control resource block groups based at least in part on monitoring for downlink communications in the one or more control resource block groups, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with a BS that transmitted the indication of the configuration for the CORESET, a timing of a transmission of the first DMRS, and a channel identifier associated with the first shared radio frequency spectrum bandwidth; and wherein the second DMRS scrambling sequence is based at least in part on the cell identifier associated with the BS, a timing of a transmission of the second DMRS, and a channel identifier associated with the second shared radio frequency spectrum bandwidth.

In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a BS for wireless communication may include a memory and one or more processors operatively coupled to the memory. The memory and the one or more processors may be configured to transmit an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET; and transmit a downlink communication in a control resource block group of the one or more control resource block groups.

In some aspects, the BS is configured with information identifying a number of resource blocks included in each of the one or more control resource block groups. In some aspects, the BS is configured with information identifying, for each of the control resource block groups, a respective starting resource block within an associated shared radio frequency spectrum bandwidth and a respective ending resource block within the associated shared radio frequency spectrum bandwidth. In some aspects, the control resource block group is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the one or more processors are further configured to transmit an SSB for a first shared radio frequency spectrum bandwidth; and perform the initial access procedure using an initial control resource block group in the first shared radio frequency spectrum bandwidth, wherein performing the initial access procedure using the first control resource block group comprises transmitting a PDCCH communication in the initial control resource block group during initial access procedure. In some aspects, the one or more processors are further configured to transmit a first DMRS in the initial control resource block group, wherein the first DMRS is scrambled based at least in part on a first DMRS scrambling sequence associated with the first shared radio frequency spectrum channel, and transmit a second DMRS in the control resource block group, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with the BS, a timing of the transmission of the first DMRS, and a channel identifier associated with the first shared radio frequency spectrum bandwidth; and wherein the second DMRS scrambling sequence is based at least in part on the cell identifier associated with the BS, a timing of the transmission of the second DMRS, and a channel identifier associated with the second shared radio frequency spectrum bandwidth. In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a non-transitory computer-readable medium may store one or more instructions for wireless communication. The one or more instructions, when executed by one or more processors of a UE, may cause the one or more processors to receive an indication of a configuration for a CORESET of a shared radio frequency spectrum carrier; identify a bitmap included in the configuration, wherein each bit in the bitmap is associated with a respective control resource block group; identify, based at least in part on a value for each bit in the bitmap, one or more control resource block groups that are included in the CORESET; and monitor for downlink communications in the one or more control resource block groups.

In some aspects, the UE is configured with information identifying a number of resource blocks included in each respective control resource block group. In some aspects, the UE is configured with information identifying, for each respective control resource block group, a respective starting resource block within an associated shared radio frequency spectrum bandwidth and a respective ending resource block within the associated shared radio frequency spectrum bandwidth. In some aspects, a control resource block group of the one or more control resource block groups is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the one or more instructions, when executed by the one or more processors, further cause the one or more processors to receive a PDCCH communication in the CORESET based at least in part on monitoring for downlink communications in the one or more control resource block groups.

In some aspects, the one or more instructions, when executed by the one or more processors, further cause the one or more processors to identify an SSB transmitted for a first shared radio frequency spectrum bandwidth of the shared radio frequency spectrum carrier; identify an initial control resource block group associated with the first shared radio frequency spectrum bandwidth; perform an initial access procedure using the initial control resource block group; and receive, based at least in part on the initial access procedure, the indication of the configuration for the CORESET. In some aspects, performing the initial access procedure using the initial control resource block group comprises receiving a PDCCH communication in the initial control resource block group during initial access procedure.

In some aspects, the one or more instructions, when executed by the one or more processors, further cause the one or more processors to receive a first DMRS in the initial control resource block group, wherein the first DMRS is scrambled based at least in part on a first DMRS scrambling sequence associated with the first shared radio frequency spectrum bandwidth, and receive a second DMRS in a control resource block group of the one or more control resource block groups based at least in part on monitoring for downlink communications in the one or more control resource block groups, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with a BS that transmitted the indication of the configuration for the CORESET, a timing of a transmission of the first DMRS, and a channel identifier associated with the first shared radio frequency spectrum bandwidth; and wherein the second DMRS scrambling sequence is based at least in part on the cell identifier associated with the BS, a timing of a transmission of the second DMRS, and a channel identifier associated with the second shared radio frequency spectrum bandwidth.

In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a non-transitory computer-readable medium may store one or more instructions for wireless communication. The one or more instructions, when executed by one or more processors of a BS, may cause the one or more processors to transmit an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET; and transmit a downlink communication in a control resource block group of the one or more control resource block groups.

In some aspects, the BS is configured with information identifying a number of resource blocks included in each of the one or more control resource block groups. In some aspects, the BS is configured with information identifying, for each of the control resource block groups, a respective starting resource block within an associated shared radio frequency spectrum bandwidth and a respective ending resource block within the associated shared radio frequency spectrum bandwidth. In some aspects, the control resource block group is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the one or more instructions, when executed by the one or more processors, further cause the one or more processors to transmit an SSB for a first shared radio frequency spectrum bandwidth; and perform the initial access procedure using an initial control resource block group in the first shared radio frequency spectrum bandwidth, wherein performing the initial access procedure using the first control resource block group comprises transmitting a PDCCH communication in the initial control resource block group during initial access procedure. In some aspects, one or more instructions, when executed by the one or more processors, further cause the one or more processors to transmit a first DMRS in the initial control resource block group, wherein the first DMRS is scrambled based at least in part on a first DMRS scrambling sequence associated with the first shared radio frequency spectrum channel, and transmit a second DMRS in the control resource block group, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with the BS, a timing of the transmission of the first DMRS, and a channel identifier associated with the first shared radio frequency spectrum bandwidth; and wherein the second DMRS scrambling sequence is based at least in part on the cell identifier associated with the BS, a timing of the transmission of the second DMRS, and a channel identifier associated with the second shared radio frequency spectrum bandwidth. In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, an apparatus for wireless communication may include means for receiving an indication of a configuration for a CORESET of a shared radio frequency spectrum carrier; means for identifying a bitmap included in the configuration, wherein each bit in the bitmap is associated with a respective control resource block group; means for identifying, based at least in part on a value for each bit in the bitmap, one or more control resource block groups that are included in the CORESET; and means for monitoring for downlink communications in the one or more control resource block groups.

In some aspects, the apparatus is configured with information identifying a number of resource blocks included in each respective control resource block group. In some aspects, the apparatus is configured with information identifying, for each respective control resource block group, a respective starting resource block within an associated shared radio frequency spectrum bandwidth and a respective ending resource block within the associated shared radio frequency spectrum bandwidth. In some aspects, a control resource block group of the one or more control resource block groups is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the one or more processors are further configured to receive a PDCCH communication in the CORESET based at least in part on monitoring for downlink communications in the one or more control resource block groups.

In some aspects, the apparatus further comprises means for identifying an SSB transmitted for a first shared radio frequency spectrum bandwidth of the shared radio frequency spectrum carrier; means for identifying an initial control resource block group associated with the first shared radio frequency spectrum bandwidth; means for performing an initial access procedure using the initial control resource block group; and means for receiving, based at least in part on the initial access procedure, the indication of the configuration for the CORESET. In some aspects, performing the initial access procedure using the initial control resource block group comprises receiving a PDCCH communication in the initial control resource block group during initial access procedure.

In some aspects, the apparatus further comprises means for receiving a first DMRS in the initial control resource block group, wherein the first DMRS is scrambled based at least in part on a first DMRS scrambling sequence associated with the first shared radio frequency spectrum bandwidth, and means for receiving a second DMRS in a control resource block group of the one or more control resource block groups based at least in part on monitoring for downlink communications in the one or more control resource block groups, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with a BS that transmitted the indication of the configuration for the CORESET, a timing of a transmission of the first DMRS, and a channel identifier associated with the first shared radio frequency spectrum bandwidth; and wherein the second DMRS scrambling sequence is based at least in part on the cell identifier associated with the BS, a timing of a transmission of the second DMRS, and a channel identifier associated with the second shared radio frequency spectrum bandwidth.

In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, an apparatus for wireless communication may include means for transmitting an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET; and means for transmitting a downlink communication in a control resource block group of the one or more control resource block groups.

In some aspects, the apparatus is configured with information identifying a number of resource blocks included in each of the one or more control resource block groups. In some aspects, the apparatus is configured with information identifying, for each of the control resource block groups, a respective starting resource block within an associated shared radio frequency spectrum bandwidth and a respective ending resource block within the associated shared radio frequency spectrum bandwidth. In some aspects, the control resource block group is positioned off-center in an associated shared radio frequency spectrum bandwidth relative to a center frequency of the shared radio frequency spectrum bandwidth.

In some aspects, the indication of the configuration is included in at least one of an RRC communication, a MAC-CE communication, or a DCI communication. In some aspects, the apparatus further comprises means for transmitting an SSB for a first shared radio frequency spectrum bandwidth; and means for performing the initial access procedure using an initial control resource block group in the first shared radio frequency spectrum bandwidth, wherein performing the initial access procedure using the first control resource block group comprises transmitting a PDCCH communication in the initial control resource block group during initial access procedure. In some aspects, the apparatus further comprises means for transmitting a first DMRS in the initial control resource block group, wherein the first DMRS is scrambled based at least in part on a first DMRS scrambling sequence associated with the first shared radio frequency spectrum channel, and means for transmitting a second DMRS in the control resource block group, wherein the second DMRS is scrambled based at least in part on a second DMRS scrambling sequence associated with a second shared radio frequency spectrum bandwidth associated with the control resource block group.

In some aspects, the first DMRS scrambling sequence is based at least in part on a cell identifier associated with the apparatus, a timing of the transmission of the first DMRS, and a channel identifier associated with the first shared radio frequency spectrum bandwidth; and wherein the second DMRS scrambling sequence is based at least in part on the cell identifier associated with the apparatus, a timing of the transmission of the second DMRS, and a channel identifier associated with the second shared radio frequency spectrum bandwidth. In some aspects, each of the one or more control resource block groups is configured by a respective control resource block group configuration for an associated shared radio frequency spectrum bandwidth. In some aspects, a starting resource block for a first control resource block group is located at a different location within an associated first shared radio frequency spectrum bandwidth relative to a location of a starting resource block for a second control resource block group within an associated second shared radio frequency spectrum bandwidth.

In some aspects, a method of wireless communication, performed by a UE, may include identifying an SSB transmitted for a first shared radio frequency spectrum channel; identifying a first control resource block group associated with the first shared radio frequency spectrum channel; performing an initial access procedure using the first control resource block group; and receiving, based at least in part on the initial access procedure, an indication of a CORESET for the first shared radio frequency spectrum channel and a second shared radio frequency spectrum channel, wherein the indication of the CORESET identifies: the first control resource block group configured for the first shared radio frequency spectrum channel, and a second control resource block group configured for the second shared radio frequency spectrum channel.

In some aspects, a UE for wireless communication may include memory and one or more processors, coupled to the memory, to identify an SSB transmitted for a first shared radio frequency spectrum channel; identify a first control resource block group associated with the first shared radio frequency spectrum channel; perform an initial access procedure using the first control resource block group; and receive, based at least in part on the initial access procedure, an indication of a CORESET for the first shared radio frequency spectrum channel and a second shared radio frequency spectrum channel, wherein the indication of the CORESET identifies: the first control resource block group configured for the first shared radio frequency spectrum channel, and a second control resource block group configured for the second shared radio frequency spectrum channel.

In some aspects, a non-transitory computer-readable medium may store one or more instructions for wireless communication. The one or more instructions, when executed by one or more processors of a UE, may cause the one or more processors to identify an SSB transmitted for a first shared radio frequency spectrum channel; identify a first control resource block group associated with the first shared radio frequency spectrum channel; perform an initial access procedure using the first control resource block group; and receive, based at least in part on the initial access procedure, an indication of a CORESET for the first shared radio frequency spectrum channel and a second shared radio frequency spectrum channel, wherein the indication of the CORESET identifies: the first control resource block group configured for the first shared radio frequency spectrum channel, and a second control resource block group configured for the second shared radio frequency spectrum channel.

In some aspects, an apparatus for wireless communication may include means for identifying an SSB transmitted for a first shared radio frequency spectrum channel; means for identifying a first control resource block group associated with the first shared radio frequency spectrum channel; means for performing an initial access procedure using the first shared radio frequency spectrum channel; and means for receiving, based at least in part on the initial access procedure, an indication of a CORESET for the first shared radio frequency spectrum channel and a second shared radio frequency spectrum channel, wherein the indication of the CORESET identifies: the first control resource block group configured for the first shared radio frequency spectrum channel, and a second control resource block group configured for the second shared radio frequency spectrum channel.

In some aspects, a method of wireless communication, performed by a BS, may include transmitting an SSB for a first shared radio frequency spectrum channel; and transmitting, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies the first control resource block group configured for the first shared radio frequency spectrum channel, and a second control resource block group configured for the second shared radio frequency spectrum channel.

In some aspects, a BS for wireless communication may include memory and one or more processors, coupled to the memory, to transmit an SSB for a first shared radio frequency spectrum channel; and transmit, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies the first control resource block group configured for the first shared radio frequency spectrum channel, and a second control resource block group configured for the second shared radio frequency spectrum channel.

In some aspects, a non-transitory computer-readable medium may store one or more instructions for wireless communication. The one or more instructions, when executed by one or more processors of a BS, may cause the one or more processors to transmit an SSB for a first shared radio frequency spectrum channel; and transmit, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies the first control resource block group configured for the first shared radio frequency spectrum channel, and a second control resource block group configured for the second shared radio frequency spectrum channel.

In some aspects, an apparatus for wireless communication may include means for transmitting an SSB for a first shared radio frequency spectrum channel; and means for transmitting, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies: the first control resource block group configured for the first shared radio frequency spectrum channel, and a second control resource block group configured for the second shared radio frequency spectrum channel.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a user equipment (UE), in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
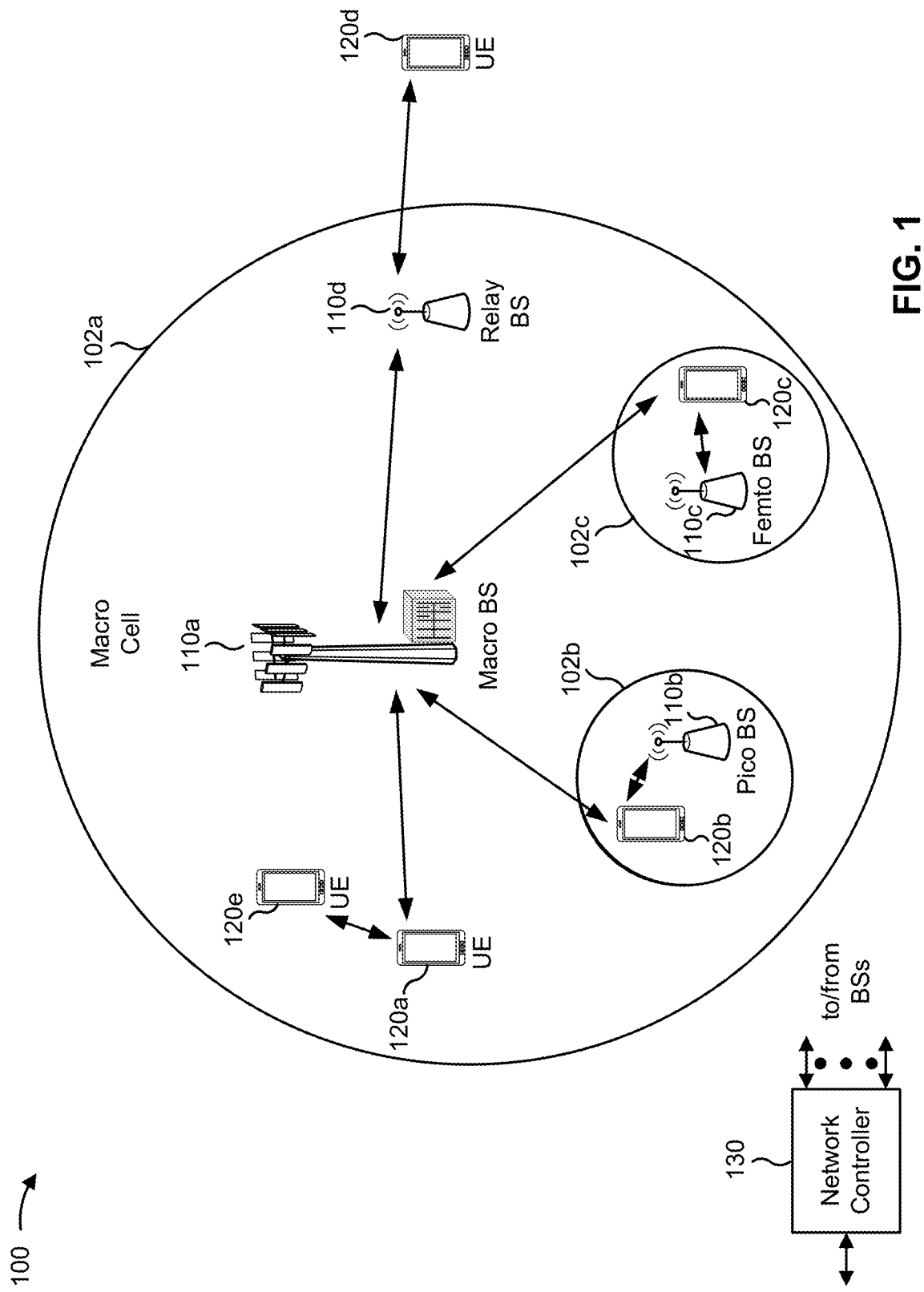
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
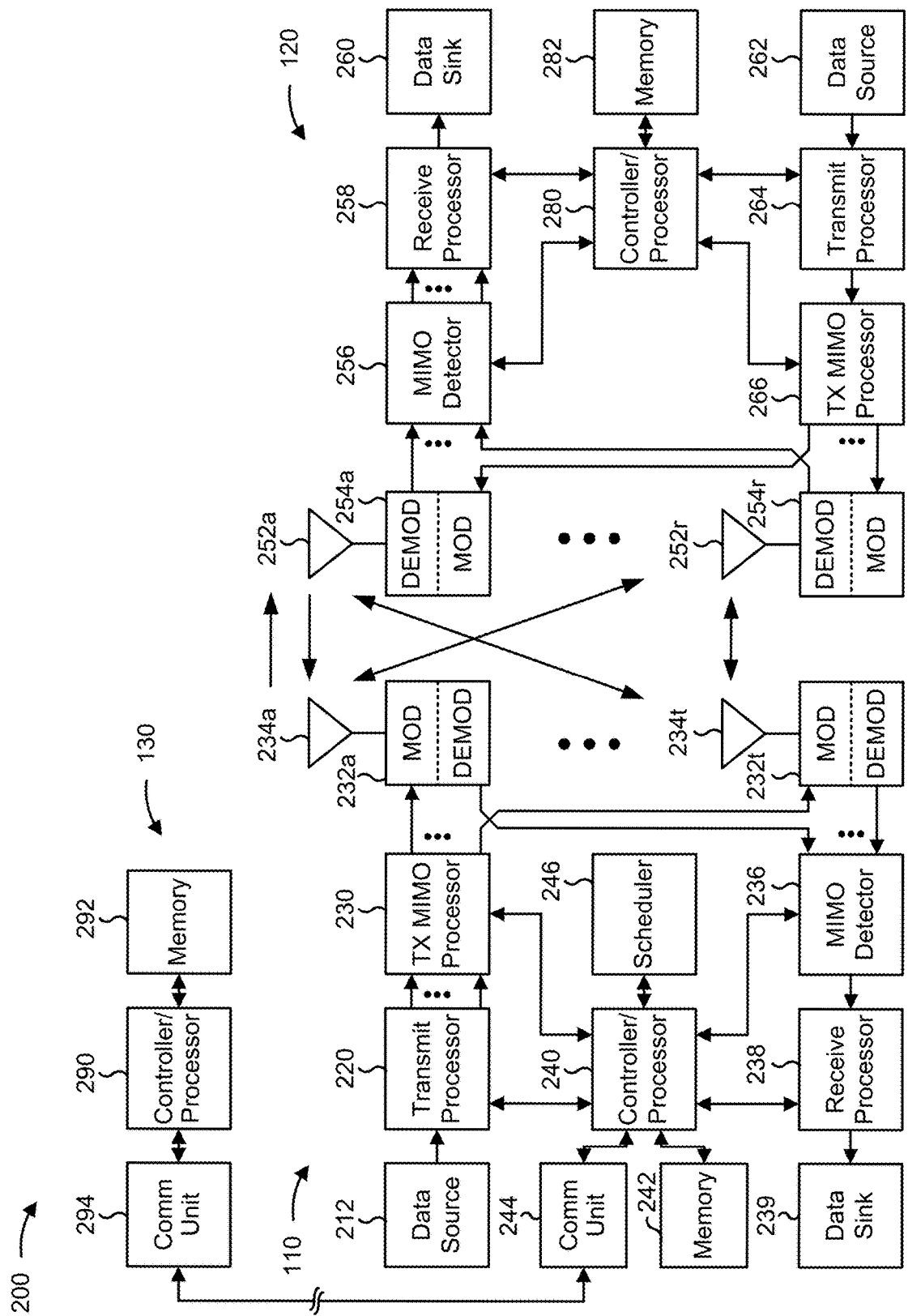
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with control resource set (CORESET) configuration for shared radio frequency spectrum, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying an SSB transmitted for a first shared radio frequency spectrum channel, means for identifying a first control resource block group associated with the first shared radio frequency spectrum channel, means for performing an initial access procedure using the first control resource block group, means for receiving, based at least in part on the initial access procedure, an indication of a CORESET for the first shared radio frequency spectrum channel and a second shared radio frequency spectrum channel, wherein the indication of the CORESET identifies the first control resource block group configured for the first shared radio frequency spectrum channel, and a second control resource block group configured for the second shared radio frequency spectrum channel, and/or the like. In some aspects, UE 120 may include means for receiving an indication of a configuration for a CORESET of a shared radio frequency spectrum carrier, means for identifying a bitmap included in the search space set configuration, wherein each bit in the bitmap is associated with a respective control resource block group, means for identifying, based at least in part on a value for each bit in the bitmap, one or more control resource block groups that are included in the CORESET, means for monitoring for downlink communications in the one or more control resource block groups, and/or the like. In some aspects, such means may include one or more components of UE 120 described in connection with FIG. 2.

In some aspects, base station 110 may include means for transmitting an SSB for a first shared radio frequency spectrum channel, means for transmitting, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies the first control resource block group configured for the first shared radio frequency spectrum channel and a second control resource block group configured for the second shared radio frequency spectrum channel, and/or the like. In some aspects, base station 110 may include means for transmitting an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET, means for transmitting a downlink communication in a control resource block group of the one or more control resource block groups, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
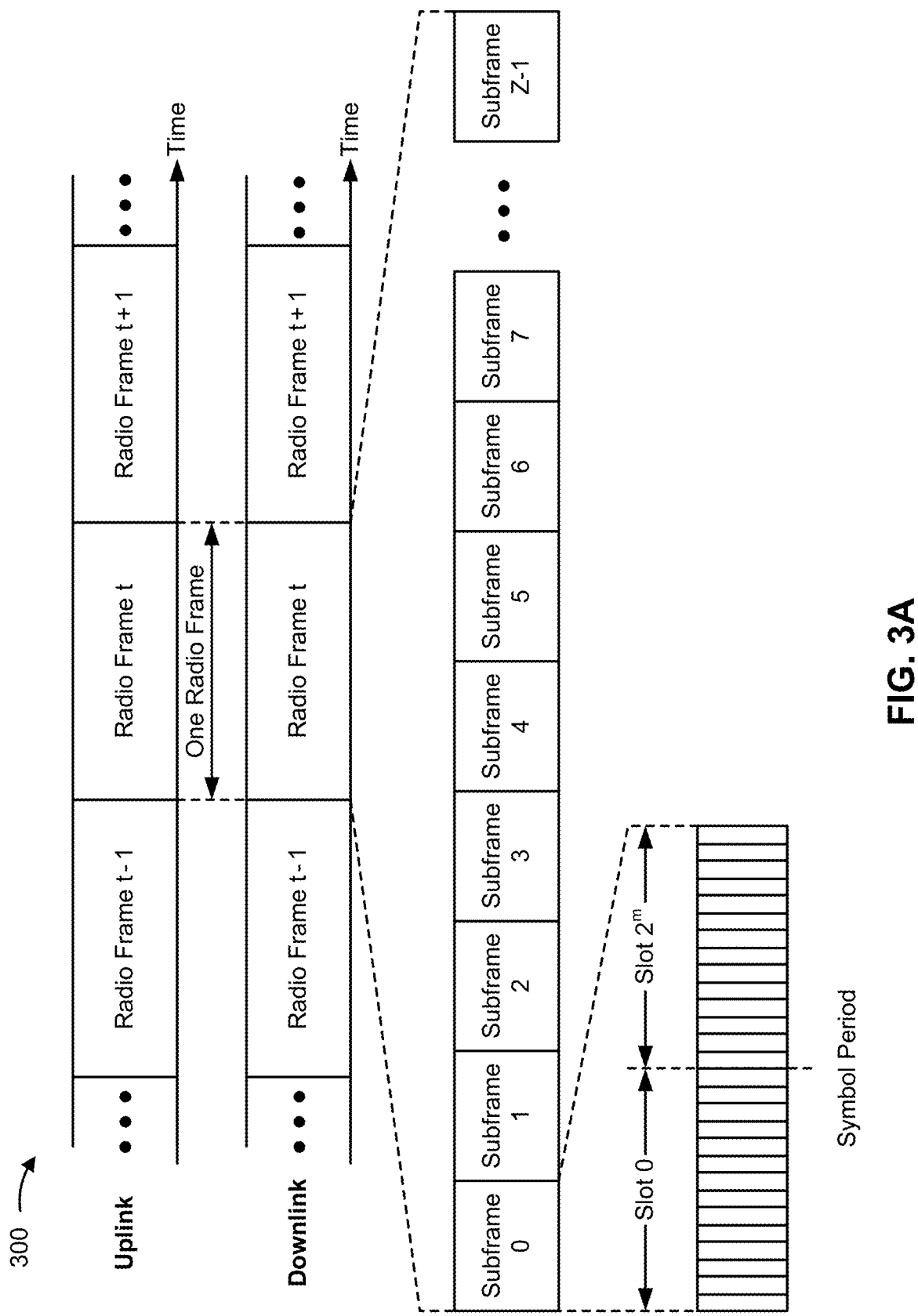
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
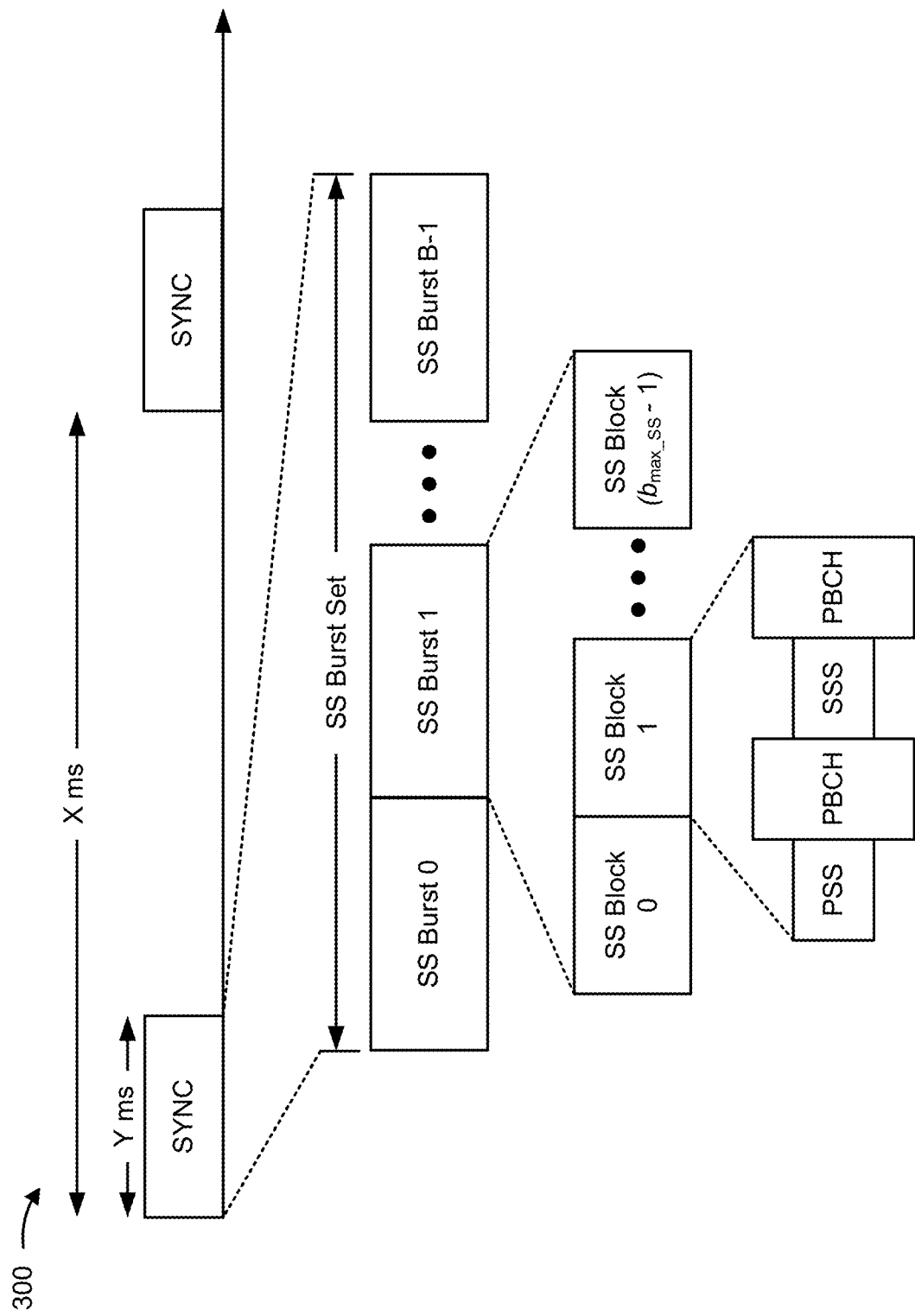
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
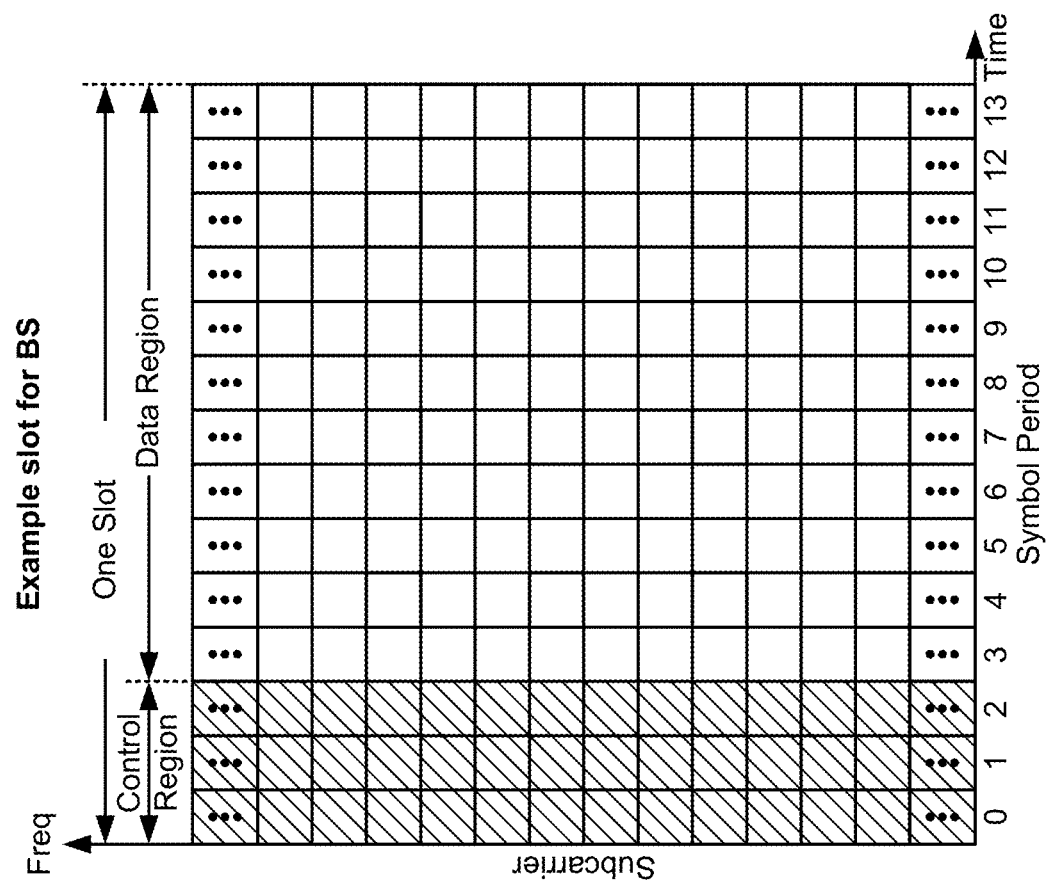
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

In a wireless network, a UE may communicate with a BS using various types of radio frequency spectrums. In some cases, the UE and BS may communicate using a licensed radio frequency spectrum, which may include a radio frequency spectrum that may be licensed to a wireless network operator for use in cellular communications. The licensed radio frequency spectrum may be configured into a plurality of channels having respective channel frequencies and respective channel bandwidths.

A licensed radio frequency spectrum channel may further be configured into a plurality of resource blocks, which may be used for uplink communications and/or downlink communications. The BS may configure the UE to monitor a control region, in the licensed radio frequency spectrum channel, that includes one or more resource blocks of the plurality of resource blocks, for downlink communications (e.g., PDCCH communications). To do so, the BS may transmit, to the UE, information identifying a control resource set (CORESET) for the one or more resource blocks.

In some cases, the information identifying the CORESET may include a bitmap. Each bit, included in the bitmap, may correspond to a group of contiguous resource blocks included in the licensed radio frequency spectrum channel, and each bit may indicate (e.g., by a 1 value or a 0 value) whether the corresponding resource block group is allocated to the CORESET. The number of resource blocks that are included in a resource block group may be referred to as a resource block granularity. As an example, a resource block granularity associated with a licensed radio frequency spectrum channel may be six resource blocks per bit.

The BS may configure a CORESET for a plurality of licensed radio frequency spectrum channels. The CORESET may be derived based at least in part on a reference frequency (which may also be referred to as Point A) in the licensed radio frequency spectrum. The BS may use the resource block granularity associated with the licensed radio frequency spectrum channel to assign respective clusters of resource block groups to the plurality of licensed radio frequency spectrum channels, and to provide gaps between the clusters.

In some cases, the UE and the BS may communicate using a shared and/or unlicensed radio frequency spectrum, which may include a radio frequency spectrum that is unlicensed and/or shared for various types of uses. Examples of shared radio frequency spectrums may include industrial, scientific, and medical (ISM) radio frequency bands, such as 2.4 GHz and 5 GHz (which may typically be used for Wi-Fi communication), and/or the like. In some cases, the BS and the UE may reuse the channel structure of a shared radio frequency spectrum that is configured for other types of communication. For example, if the BS and the UE communicate via 5 GHz, the BS and the UE may reuse the channel frequencies and channel bandwidths that are configured for Wi-Fi communication. An example channel bandwidth of a shared radio frequency spectrum channel may be 20 MHz. The BS and the UE may be configured to operate in wideband using multiple adjacent 20 MHz channels at the same time. Each 20 MHz channel may be referred to as a shared radio frequency spectrum bandwidth for purposes of cellular communication.

To permit cellular communication using the channel structure of the shared radio frequency spectrum, the shared radio frequency spectrum bandwidths may be configured into respective pluralities of resource blocks, which may be used for uplink communications and/or downlink communications. The BS may configure the UE to monitor a control region in a shared radio frequency spectrum bandwidth by transmitting, to the UE, an indication of a CORESET (or a configuration for a CORESET) for a plurality of resource blocks included in the shared radio frequency spectrum bandwidth. The control region may comprise one or more resource blocks of the plurality of resource blocks, and the UE may monitor the one or more resource blocks for downlink communications (e.g., PDCCH communications).

As indicated above, the information identifying the CORESET may include a bitmap. In some cases, the resource block granularity associated with the licensed radio frequency spectrum channel may be inefficient for use with shared radio frequency spectrum channels. For example, a shared radio frequency spectrum bandwidth having a 20 MHz channel bandwidth and a 30 KHz subcarrier spacing may be configured into 51 resource blocks. The BS may derive the CORESET for the shared radio frequency spectrum bandwidth (and other shared radio frequency spectrum bandwidths) based at least in part on a reference frequency in the shared radio frequency spectrum carrier and the resource block granularity associated with the licensed radio frequency spectrum channel. Due to the resource block granularity associated with the licensed radio frequency spectrum channel, the resulting resource block group clusters may be positioned such that a resource block group cluster for a particular shared radio frequency spectrum bandwidth is not positioned close to the center of the shared radio frequency spectrum bandwidth and/or is positioned outside of the shared radio frequency spectrum bandwidth.

Moreover, dithering of the reference frequency may cause the locations of the resource block group clusters to shift, which in turn can cause a reduction in gaps between resource block group clusters and/or resource block group clusters to drift at least partially outside of a corresponding shared radio frequency spectrum bandwidth.

In some cases, a more granular resource block granularity may be used to permit fine-tuning of resource block group clusters within a CORESET. However, increasing the resource block granularity results in an increased number of bits in the bitmap, which in turn increases the signaling overhead of the bitmap.

Some aspects, described herein, provide techniques and apparatuses for CORESET configuration for shared radio frequency spectrum carrier. In some aspects, instead of deriving, based at least in part on a reference frequency, the resource block group clusters, that are to be assigned to each shared radio frequency spectrum bandwidth in a CORESET, the BS and the UE may be configured with information identifying control resource block group configurations (which may also be referred to as resource block sets) for each shared radio frequency spectrum bandwidth. A control resource block group configuration for a particular shared radio frequency spectrum bandwidth may specify one or more parameters for a single control resource block group for the shared radio frequency spectrum bandwidth (as opposed to a resource block cluster that includes a plurality of resource block groups). The one or more parameters may specify the number of resource blocks that are included in the control resource block group, may specify a starting resource block and an ending resource block for the control resource block group (which may indicate a location of the control resource block group within the shared radio frequency spectrum bandwidth), and/or the like.

In this way, the BS does not need to configure the control resource block groups based at least in part on a reference frequency or a resource block granularity, which reduces the likelihood that the control resource block groups will overlap or shift outside of corresponding shared radio frequency spectrum bandwidths. Moreover, since each shared radio frequency spectrum bandwidth is associated with a single control resource block group, a single bit in the bitmap for the CORESET may correspond to a single control resource block group and therefore may be used to represent a shared radio frequency spectrum bandwidth. This reduces the number of bits, that are included in the bitmap, relative to using a plurality of bits to indicate a plurality of resource block groups associated with a shared radio frequency spectrum bandwidth, which reduces the signaling overhead of the bitmap.

Figure 5A:
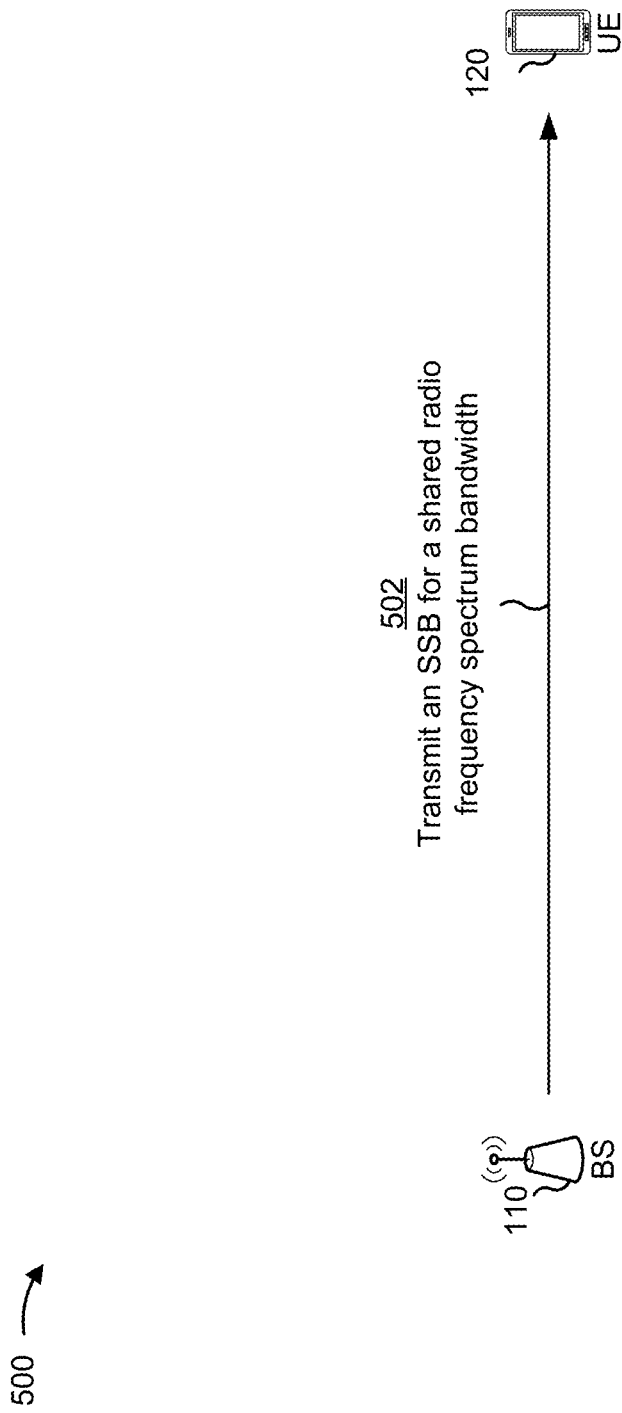
FIGS. 5A-5C are diagrams illustrating an example of control resource set (CORESET) configuration for shared radio frequency spectrum, in accordance with various aspects of the present disclosure.
Figure 5B:
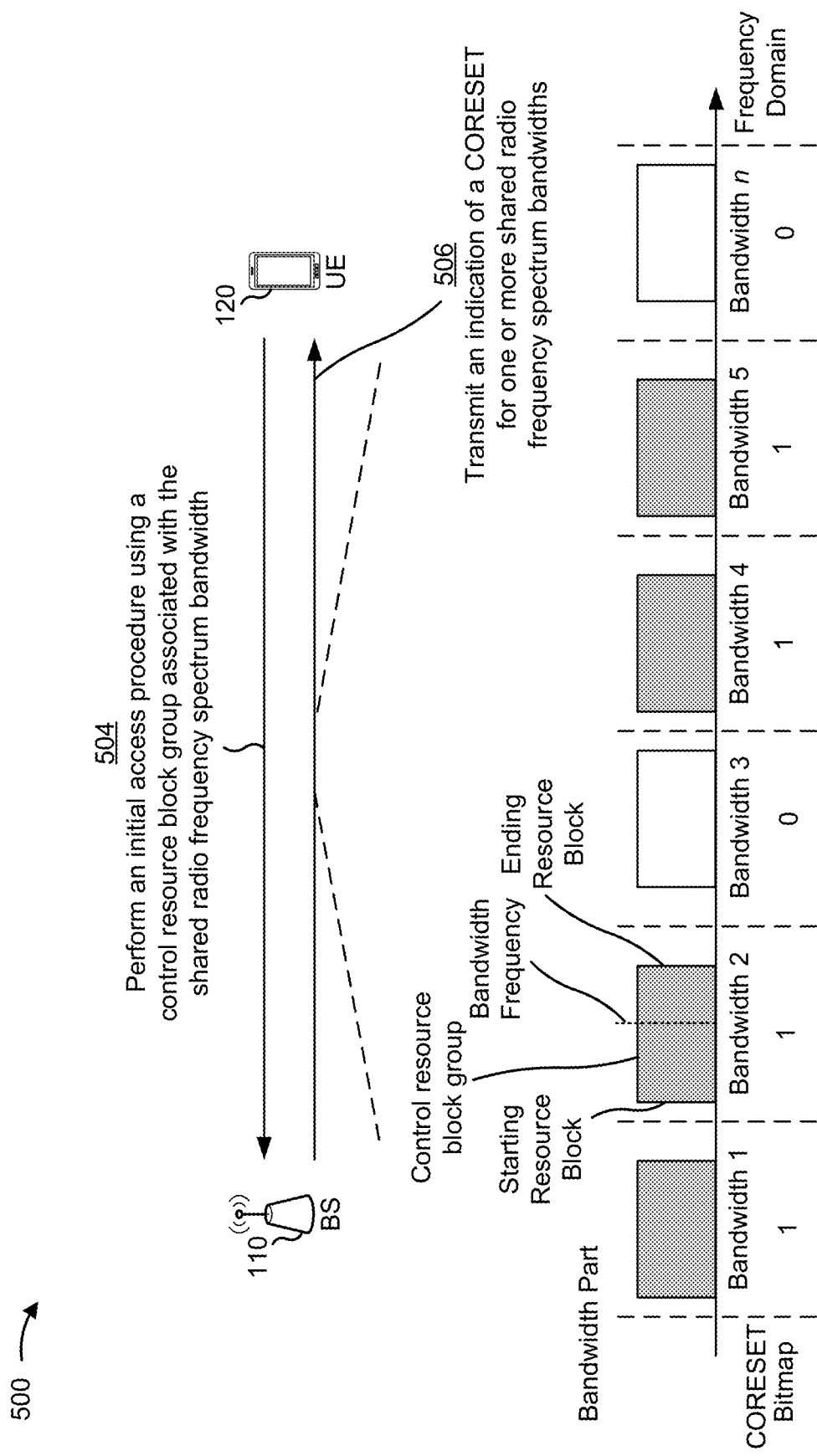
Figure 5C:
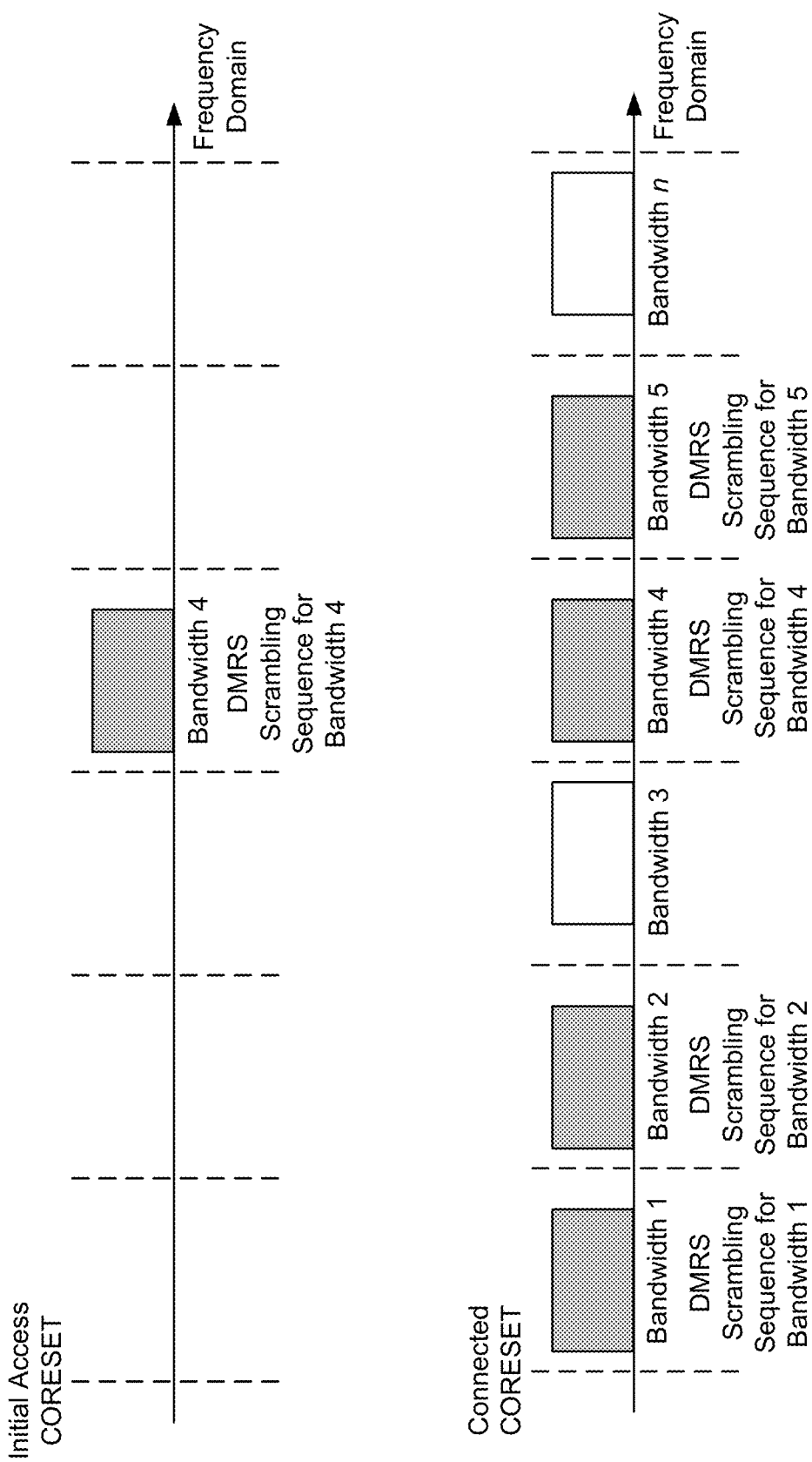

FIGS. 5A-5C are diagrams illustrating an example 500 of CORESET configuration for shared radio frequency spectrum, in accordance with various aspects of the present disclosure. As shown in FIGS. 5A-5C, example 500 may include a user equipment (e.g., UE 120) and a base station (e.g., BS 110). In some aspects, BS 110 and UE 120 may be included in a wireless network (e.g., wireless network 100). In some aspects, BS 110 and UE 120 may communicate using various radio frequency spectrums, such as a licensed radio frequency spectrum, a shared radio frequency spectrum, and/or the like. In some aspects, BS 110 and UE 120 may establish a connection on a shared radio frequency spectrum bandwidth (or channel) by performing an initial access procedure such as a random access channel (RACH) procedure. The RACH procedure may include a four-step RACH procedure, a two-step RACH procedure, and/or the like.

As shown in FIG. 5A, and by reference number 502, to permit UE 120 to communicatively connect with BS 110, BS 110 may transmit synchronization signal block (SSB). The SSB may include various synchronization signals, such as a primary synchronization signal (PSS), a secondary synchronization signal (SSS), and/or the like. UE 120 may use the PSS and SSS for cell search and acquisition. For example, UE 120 may use the PSS to determine symbol timing, and may use the SSS to determine a physical cell identifier, associated with BS 110, and frame timing.

In some aspects, BS 110 may transmit the SSB using a control resource block group (or resource block group) configured for a shared radio frequency spectrum bandwidth (or channel) of a plurality of shared radio frequency spectrum bandwidths included in the shared radio frequency spectrum carrier. As indicated above, BS 110 and UE 120 may be configured with information identifying control resource block group configurations for each shared radio frequency spectrum bandwidths. Thus, each control resource block group may be defined for an associated shared radio frequency spectrum bandwidth. A control resource block group configuration for a particular shared radio frequency spectrum bandwidth may specify one or more parameters for a single control resource block group for the shared radio frequency spectrum bandwidth (as opposed to a resource block cluster that includes a plurality of resource block groups). The one or more parameters may specify the number of resource blocks that are included in the control resource block group (e.g., 48 resource blocks, 50 resource blocks, and/or the like), may specify a starting resource block and an ending resource block for the control resource block group (which may indicate a location of the control resource block group, within the shared radio frequency spectrum bandwidth or channel, relative to the channel or center frequency of the shared radio frequency spectrum channel or resource block), and/or the like.

As shown in FIG. 5B, a control resource block group may be located within a corresponding shared radio frequency spectrum bandwidth. In some aspects, the center of the control resource block group may be located at or near the channel frequency or center frequency of the shared radio frequency spectrum bandwidth. In some aspects, the center of the control resource block group may be off-centered relative to the center frequency or channel frequency of the shared radio frequency spectrum bandwidth. In some aspects, the control resource block groups, for the plurality of shared radio frequency spectrum bandwidths (e.g., Bandwidth 1 through Bandwidth n), may be spaced apart by a gap of one or more resource blocks to provide guard-banding and to ensure that the control resource block groups do not overlap.

In some aspects, BS 110 and UE 120 may be configured with the information identifying the control resource block group configurations when BS 110 and/or UE 120 is deployed in the wireless network, may be configured with the information identifying the control resource block group configurations via a signaling communication (e.g., a radio resource control (RRC) communication, a medium access control control element (MAC-CE) communication, a downlink control information (DCI) communication, and/or the like), and/or the like. In some aspects, the information identifying the control resource block group configurations may be included in a data structure, such as a table, a database, a specification, and electronic file, and/or the like, may be included in a memory device, may be hard-coded into a circuit or processor, and/or the like.

In some aspects, UE 120 may use the transmission of the SSB in the shared radio frequency spectrum bandwidth as an implicit indication that the control resource block group, associated with the shared radio frequency spectrum bandwidth, is included in an initial access (or random access) CORESET for BS 110. That is, UE 120 may detect the SSB being transmitted in the shared radio frequency spectrum bandwidth, may perform a look-up in the data structure that includes the information identifying the control resource block group configurations, and may identify the control resource block group based at least in part on performing the look-up. In this way, BS 110 may not need to perform additional signaling to indicate the initial access CORESET to UE 120, which reduces the processing, memory, and/or radio resources that would have otherwise been consumed by transmitting the signaling to indicate the initial access CORESET.

As further shown in FIG. 5B, and by reference number 504, UE 120 and BS 110 may perform an initial access procedure using the control resource block group configured for the shared radio frequency spectrum bandwidth for which the SSB was transmitted. UE 120 may initiate the initial access procedure using the SSB based at least in part on identifying the SSB. For example, UE 120 may identify a RACH occasion, associated with the SSB and may select a RACH preamble in the RACH occasion. UE 120 may transmit a RACH communication (e.g., a msg1 communication in a four-step RACH procedure, a msgA communication in a two-step RACH procedure, and/or the like) in the RACH occasion, and the RACH communication may identify the RACH preamble.

UE 120 may use the control resource block group, configured for the shared radio frequency spectrum bandwidth for which the SSB was transmitted, to monitor the resource blocks included in the control resource block group in order to receive a PDCCH communication from BS 110 in the resource blocks. In some aspects, UE 120 may identify the control resource block group based at least in part on BS 110 transmitting the SSB for the shared radio frequency spectrum bandwidth associated with the control resource block group. UE 120 may identify the control resource block group based at least in part on the association between the control resource block group and the shared radio frequency spectrum bandwidth being hard-coded in the data structure, such as a table, a database, a specification, electronic file, and/or the like, configured at UE 120. The PDCCH communication may include a RACH communication, such as a msg2 communication in a four-step RACH procedure, a msgB communication in a two-step RACH procedure, and/or the like.

As further shown in FIG. 5B, and by reference number 506, BS 110 may transmit, to UE 120, an indication of a CORESET (e.g., a connected CORESET) for one or more shared radio frequency spectrum bandwidths. BS 110 may transmit the indication of the CORESET based at least in part on the initial access procedure. For example, BS 110 may transmit the indication of the CORESET during the initial access procedure, after the initial access procedure has been completed, and/or the like. In some aspects, BS 110 may transmit the indication of the CORESET in a signaling communication, such as an RRC communication, a MAC-CE communication, a DCI communication, and/or another type of signaling communication.

The CORESET may be a wideband CORESET that is used by UE 120 for connected, regular, and/or normal access once the connection between BS 110 and UE 120 has been established. In this way, the CORESET may configure UE 120 to monitor a control region that includes a plurality of resource blocks that span a plurality of subbands to receive downlink communications (e.g., PDCCH communications). The CORESET may comprise an entire downlink bandwidth part (BWP) allocated to UE 120, or a portion of the downlink BWP.

As further shown in FIG. 5B, the indication of the CORESET may identify the control resource block groups, and corresponding shared radio frequency spectrum bandwidths, that are included in the CORESET. In some aspects, the shared radio frequency spectrum bandwidths may include the shared radio frequency spectrum bandwidth that was used for initial access or random access by UE 120, may include one or more other shared radio frequency spectrum bandwidths, and/or the like. In this way, the control resource block group that was used for the initial access procedure may be used as a building block for the CORESET.

The indication of the CORESET may include a bitmap or another type of indication. The bitmap may be included in a configuration, such as a CORESET configuration, a search space set configuration for the CORESET, and/or another type of configuration. The bitmap may include a plurality of bits, where each bit of the plurality of bits corresponds to a respective control resource block group (and corresponding shared radio frequency spectrum bandwidth). The value of a bit may indicate whether the corresponding control resource block group is included in the CORESET. For example, a bit having a first value (e.g., a 1 value) may indicate the corresponding control resource block group is included in the CORESET. As another example, a bit having a second value (e.g., a 0 value) may indicate that the corresponding control resource block group is not included in the CORESET. In the example illustrated in FIG. 5B, the example bitmap may indicate that the control resource block groups corresponding to Bandwidth 1, Bandwidth 2, Bandwidth 4, and Bandwidth 5 are included in the CORESET, and may indicate that the control resource block groups corresponding to Bandwidth 3 and Bandwidth n are not included in the CORESET. Thus, in this example, each bit in the bitmap from left to right may correspond to control resource block group increasing in frequency (e.g., the first bit in the bitmap may correspond to the lowest-frequency control resource block group, the second bit in the bit map may correspond to the next highest frequency control resource block group, and so on).

In some aspects, BS 110 may transmit a demodulation reference signaling (DMRS) in a shared radio frequency spectrum bandwidth. In some cases, a DMRS scrambling of the DMRS may be a function of timing of the transmission of the DMRS and a cell identifier associated with BS 110. In some cases, the DMRS scrambling may be determined based on a reference frequency. However, in this case, the DMRS sequence in a particular control resource block group may vary from the control resource block group being used for initial access by UE 120 and if the control resource block group is used for a wideband CORESET for another UE.

As shown in FIG. 5C, instead of determining the DMRS scrambling from the reference frequency for the wideband CORSET, BS 110 may assign a respective DMRS scrambling sequences to each shared radio frequency spectrum bandwidth. In this way, BS 110 may scramble a DMRS, that is transmitted in a particular shared radio frequency spectrum bandwidth, based at least in part on the DMRS scrambling sequence associated with the shared radio frequency spectrum bandwidth.

A DMRS scrambling sequence, for a particular shared radio frequency spectrum bandwidth, may be determined based at least in part on a function of cell identifier associated with BS 110, a time of the transmission of the DMRS, and a channel identifier associated with the shared radio frequency spectrum bandwidth. The DMRS scrambling sequence may be filled in the DMRS resource elements starting from the lowest resource element in the control resource block group associated with the shared radio frequency spectrum bandwidth.

As an example, for an initial access CORESET, in which Bandwidth 4 of a shared radio frequency spectrum is selected for initial access, BS 110 may scramble a DMRS, transmitted in a control resource block group associated with Bandwidth 4, based at least in part on a DMRS scrambling sequence for Bandwidth 4. As another example, for a connected CORESET that includes Bandwidth 1, Bandwidth 2, Bandwidth 4, and Bandwidth 5 of the shared radio frequency spectrum carrier, BS 110 may scramble a DMRS, transmitted in a control resource block group associated with Bandwidth 1, based at least in part on a DMRS scrambling sequence for Bandwidth 1, may scramble a DMRS, transmitted in a control resource block group associated with Bandwidth 2, based at least in part on a DMRS scrambling sequence for Bandwidth 2, and so on. BS 110 may configure various configurations of initial access CORESETs and connected CORESETs based at least in part on the techniques described above, may configure various configurations of DMRSs and/or DMRS scrambling sequences based at least in part on the techniques described above, and/or the like.

In some aspects, UE 120 may receive the indication of the CORESET or the configuration, and may use the indication of the CORESET or the configuration to identify the control resource block groups (and thus, the shared radio frequency spectrum bandwidths) that are included in the CORESET. For example, UE 120 may identify the bitmap included in the configuration and may determine the respective values of the bits included in the bitmap to determine or identify the control resource block groups are included in the CORESET. As an example, UE 120 may determine that bits having a 1 value indicate that the corresponding control resource block groups are included in the CORESET, and may determine that bits have a 0 value indicate that the corresponding control resource block groups are not included in the CORESET. As another example, UE 120 may determine that bits having a 0 value indicate that the corresponding control resource block groups are included in the CORESET, and may determine that bits have a 1 value indicate that the corresponding control resource block groups are not included in the CORESET. Other examples and/or indicators may be used to indicate whether a control resource block group is included in a CORESET.

In some aspects, BS 110 and UE 120 may communicate based at least in part on the control resource block groups included in the CORESET. For example, UE 120 may identify, based at least in part on the control resource block configurations configured at UE 120, respective pluralities of resource blocks that are included in the control resource block groups included in the CORESET. For example, UE 120 may determine that the control resource block group, associated with Bandwidth 1, is included in the CORESET, may identify the control resource block group configuration for the control resource block group, and may identify, based at least in part on the starting resource block and the ending resource block indicated in the control resource block group configuration, the plurality of resource blocks included in the control resource block group. UE 120 may monitor a control region that includes the plurality of resource blocks for PDCCH communications transmitted from BS 110, and BS 110 may transmit, to UE 120, PDCCH communications in the plurality of resource blocks.

In this way, BS 110 and UE 120 may be configured with information identifying control resource block group configurations for each shared radio frequency spectrum bandwidth. In this way, BS 110 does not need to configure control resource block groups based at least in part on a reference frequency or a resource block granularity, which reduces the likelihood that the control resource block groups may overlap and/or shift outside of corresponding shared radio frequency spectrum bandwidths. Moreover, since each shared radio frequency spectrum bandwidth is associated with a single control resource block group, a single bit in the bitmap for the CORESET may correspond to a single control resource block group and therefore may be used to represent a shared radio frequency spectrum bandwidth. This reduces the number of bits, that are included in the bitmap, relative to using a plurality of bits to indicate a plurality of resource block groups associated with a shared radio frequency spectrum bandwidth, which reduces the signaling overhead of the bitmap.

As indicated above, FIGS. 5A-5C are provided as an example. Other examples may differ from what is described with respect to FIGS. 5A-5C.

FIG. 6 is a diagram illustrating an example process 600 performed, for example, by a UE, in accordance with various aspects of the present disclosure. Example process 600 is an example where a UE (e.g., UE 120) performs operations associated with CORESET configuration for shared radio frequency spectrum.

As shown in FIG. 6, in some aspects, process 600 may include identifying an SSB transmitted for a first shared radio frequency spectrum channel (block 610). For example, the UE (e.g., using receive processor 258, transmit processor 264, controller/processor 280, memory 282, and/or the like) may identify an SSB for a first shared radio frequency spectrum channel, as described above.

As further shown in FIG. 6, in some aspects, process 600 may include identifying a first control resource block group associated with the first shared radio frequency spectrum channel (block 620). For example, the UE (e.g., using receive processor 258, transmit processor 264, controller/processor 280, memory 282, and/or the like) may identify a first control resource block group associated with the first shared radio frequency spectrum channel, as described above.

As further shown in FIG. 6, in some aspects, process 600 may include performing an initial access procedure using the first control resource block group (block 630). For example, the UE (e.g., using receive processor 258, transmit processor 264, controller/processor 280, memory 282, and/or the like) may perform an initial access procedure using the first control resource block group, as described above.

As further shown in FIG. 6, in some aspects, process 600 may include receiving, based at least in part on the initial access procedure, an indication of a CORESET for the first shared radio frequency spectrum channel and a second shared radio frequency spectrum channel, wherein the indication of the CORESET identifies the first control resource block group configured for the first shared radio frequency spectrum channel and a second control resource block group configured for the second shared radio frequency spectrum channel (block 640). For example, the UE (e.g., using receive processor 258, transmit processor 264, controller/processor 280, memory 282, and/or the like) may receive, based at least in part on the initial access procedure, an indication of a CORESET for the first shared radio frequency spectrum channel and a second shared radio frequency spectrum channel, as described above. In some aspects, the indication of the CORESET identifies the first control resource block group configured for the first shared radio frequency spectrum channel and a second control resource block group configured for the second shared radio frequency spectrum channel.

Process 600 may include additional aspects, such as any single implementation or any combination of aspects described below and/or in connection with one or more other processes described elsewhere herein.

In some aspects, the UE is configured with information identifying a number of resource blocks included in the first control resource block group and the second control resource block group. In some aspects, the UE is configured with information identifying, for the first control resource block group and the second control resource block group, a respective starting resource block and a respective ending resource block. In some aspects, the UE is configured with information identifying a first location, in the CORESET, of the first control resource block group relative to a first channel frequency associated with the first shared radio frequency spectrum channel and a second location, in the CORESET, of the second control resource block group relative to a second channel frequency associated with the second shared radio frequency spectrum channel.

In some aspects, the indication of the CORESET is included in at least one of an RRC communication, a MAC-CE communication, or a DCI communication. In some aspects, the indication of the CORESET comprises: a plurality of bits included in a bitmap. In some aspects, a first bit, of the plurality of bits, corresponds to the first control resource block group. In some aspects, a second bit, of the plurality of bits, corresponds to the second control resource block group.

In some aspects, process 600 comprises receiving a PDCCH communication in the CORESET. In some aspects, performing the initial access procedure using the first control resource block group comprises receiving a PDCCH communication in the first control resource block group during initial access procedure. In some aspects, process 600 comprises receiving a first DMRS in the first control resource block group, wherein the first DMRS is scrambled based at least in part on a first DMRS scrambling sequence associated with the first shared radio frequency spectrum channel, and receiving a second DMRS in the second control resource block group, wherein the second DMRS is scrambled based at least in part on a second DMRS scrambling sequence associated with the second shared radio frequency spectrum channel. In some aspects, wherein the first DMRS scrambling sequence is based at least in part on a cell identifier associated with a base station (BS) that transmitted the indication of the CORESET, a timing of a transmission of the first DMRS, and a channel identifier associated with the first shared radio frequency spectrum channel. In some aspects, the second DMRS scrambling sequence is based at least in part on the cell identifier associated with the BS, a timing of a transmission of the second DMRS, and a channel identifier associated with the first shared radio frequency spectrum channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
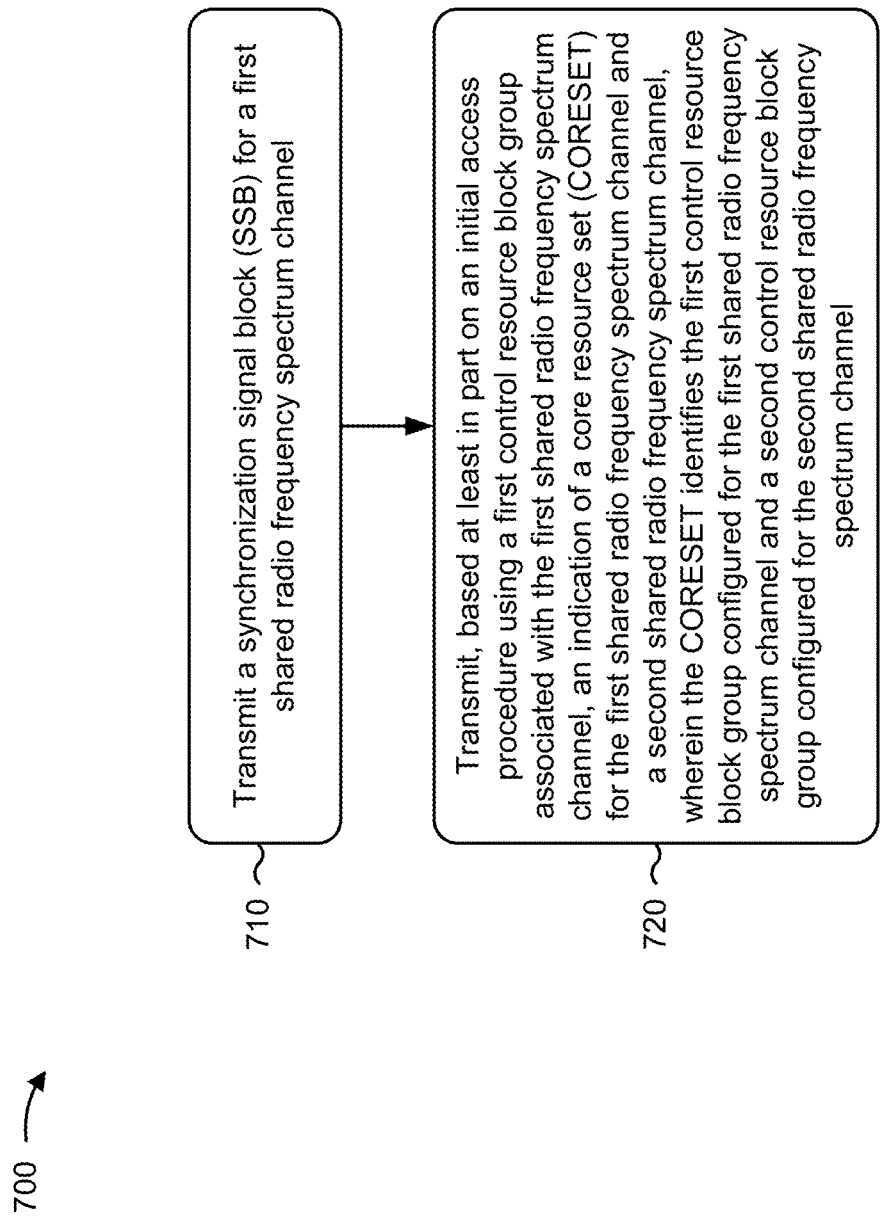
FIG. 7 is a diagram illustrating an example process performed, for example, by a base station (BS), in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with CORESET configuration for shared radio frequency spectrum.

As shown in FIG. 7, in some aspects, process 700 may include transmitting an SSB for a first shared radio frequency spectrum channel (block 710). For example, the BS (e.g., using transmit processor 220, receive processor 238, controller/processor 240, memory 242, and/or the like) may transmit an SSB for a first shared radio frequency spectrum channel, as described above.

As further shown in FIG. 7, in some aspects, process 700 may include transmitting, based at least in part on an initial access procedure using a first control resource block group associated with the first shared radio frequency spectrum channel, an indication of a CORESET for the first shared radio frequency spectrum channel and a second shared radio frequency spectrum channel, wherein the indication of the CORESET identifies the first control resource block group configured for the first shared radio frequency spectrum channel and a second control resource block group configured for the second shared radio frequency spectrum channel (block 720). For example, the BS (e.g., using transmit processor 220, receive processor 238, controller/processor 240, memory 242, and/or the like) may transmit, based at least in part on an initial access procedure using a first control resource block group associated with the first shared radio frequency spectrum channel, an indication of a CORESET for the first shared radio frequency spectrum channel and a second shared radio frequency spectrum channel, as described above. In some aspects, the indication of the CORESET identifies the first control resource block group configured for the first shared radio frequency spectrum channel and a second control resource block group configured for the second shared radio frequency spectrum channel.

Process 700 may include additional aspects, such as any single implementation or any combination of aspects described below and/or in connection with one or more other processes described elsewhere herein.

In some aspects, the BS is configured with information identifying a number of resource blocks included in the first control resource block group and the second control resource block group. In some aspects, the BS is configured with information identifying, for the first control resource block group and the second control resource block group, a respective starting resource block and a respective ending resource block.

In some aspects, the BS is configured with information identifying a first location, in the CORESET, of the first control resource block group relative to a first channel frequency associated with the first shared radio frequency spectrum channel, and a second location, in the CORESET, of the second control resource block group relative to a second channel frequency associated with the second shared radio frequency spectrum channel.

In some aspects, the indication of the CORESET is included in at least one of an RRC communication, a MAC-CE communication, or a DCI communication. In some aspects, the indication of the CORESET comprises: a plurality of bits included in a bitmap. In some aspects, a first bit, of the plurality of bits, corresponds to the first control resource block group. In some aspects, a second bit, of the plurality of bits, corresponds to the second control resource block group.

In some aspects, process 700 comprises transmitting a PDCCH communication in the CORESET. In some aspects, process 700 comprises performing the initial access procedure using the first control resource block group, wherein performing the initial access procedure using the first control resource block group comprises transmitting a PDCCH communication in the first control resource block group during initial access procedure. In some aspects, process 700 comprises transmitting a first DMRS in the first control resource block group, wherein the first DMRS is scrambled based at least in part on a first DMRS scrambling sequence associated with the first shared radio frequency spectrum channel, and transmitting a second DMRS in the second control resource block group, wherein the second DMRS is scrambled based at least in part on a second DMRS scrambling sequence associated with the second shared radio frequency spectrum channel. In some aspects, the first DMRS scrambling sequence is based at least in part on a cell identifier associated with the BS, a timing of the transmission of the first DMRS, and a channel identifier associated with the first shared radio frequency spectrum channel. In some aspects, the second DMRS scrambling sequence is based at least in part on the cell identifier associated with the BS, a timing of the transmission of the second DMRS, and a channel identifier associated with the first shared radio frequency spectrum channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

Figure 8:
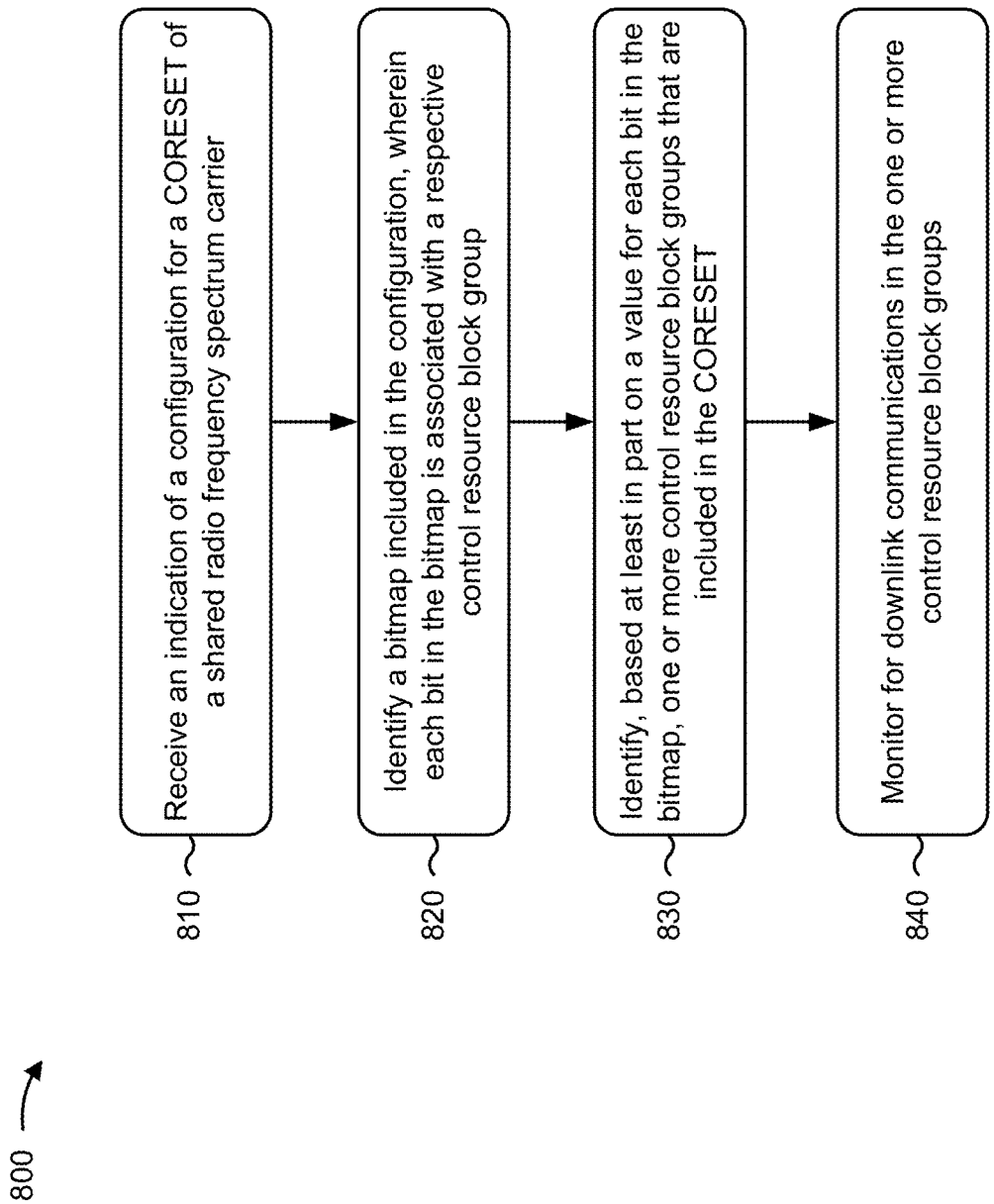
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with configuring a CORESET for a shared radio frequency spectrum carrier.

As shown in FIG. 8, in some aspects, process 800 may include receiving an indication of a configuration for a CORESET of a shared radio frequency spectrum carrier (block 810). For example, the UE (e.g., using receive processor 258, transmit processor 264, controller/processor 280, memory 282, and/or the like) may receive an indication of a configuration for a CORESET of a shared radio frequency spectrum carrier, as described above.

As further shown in FIG. 8, in some aspects, process 800 may include identifying a bitmap included in the configuration, wherein each bit in the bitmap is associated with a respective control resource block group (block 820). For example, the UE (e.g., using receive processor 258, transmit processor 264, controller/processor 280, memory 282, and/or the like) may identify a bitmap included in the configuration, as described above. In some aspects, each bit in the bitmap is associated with a respective control resource block group.

As further shown in FIG. 8, in some aspects, process 800 may include identifying, based at least in part on a value for each bit in the bitmap, one or more control resource block groups that are included in the CORESET (block 830). For example, the UE (e.g., using receive processor 258, transmit processor 264, controller/processor 280, memory 282, and/ or the like) may identify, based at least in part on a value for each bit in the bitmap, one or more control resource block groups that are included in the CORESET, as described above.

As further shown in FIG. 8, in some aspects, process 800 may include monitoring for downlink communications in the one or more control resource block groups (block 840). For example, the UE (e.g., using receive processor 258, transmit processor 264, controller/processor 280, memory 282, and/or the like) may monitor for downlink communications in the one or more control resource block groups, as described above.

Process 800 may include additional aspects, such as any single aspect or any combination of aspects described below and/or in connection with one or more other processes described elsewhere herein.

In a first aspect, the UE is configured with information identifying a number of resource blocks included in each respective control resource block group. In a second aspect, alone or in combination with the first aspect, the UE is configured with information identifying, for each respective control resource block group a respective starting resource block within an associated shared radio frequency spectrum bandwidth and a respective ending resource block within the associated shared radio frequency spectrum bandwidth.

In a third aspect, alone or in combination with one or more of the first and second aspects, a control resource block group of the one or more control resource block groups is positioned off-center in an associated shared radio frequency spectrum bandwidth relative to a center frequency of the shared radio frequency spectrum bandwidth. In a fourth aspect, alone or in combination with one or more of the first through third aspects, the indication of the configuration is included in at least one of an RRC communication, a MAC-CE communication, or a DCI communication.

In a fifth aspect, alone or in combination with one or more of the first through fourth aspects, process 800 includes receiving a PDCCH communication in the CORESET based at least in part on monitoring for downlink communications in the one or more control resource block groups. In a sixth aspect, alone or in combination with one or more of the first through fifth aspects, process 800 includes identifying an SSB transmitted for a first shared radio frequency spectrum bandwidth of the shared radio frequency spectrum carrier; identifying an initial control resource block group associated with the first shared radio frequency spectrum bandwidth; performing an initial access procedure using the initial control resource block group; and receiving, based at least in part on the initial access procedure, the indication of the configuration for the CORESET.

In a seventh aspect, alone or in combination with one or more of the first through sixth aspects, performing the initial access procedure using the initial control resource block group comprises receiving a PDCCH communication in the initial control resource block group during initial access procedure. In an eighth aspect, alone or in combination with one or more of the first through seventh aspects, process 800 includes receiving a first DMRS in the initial control resource block group, wherein the first DMRS is being scrambled based at least in part on a first DMRS scrambling sequence associated with the first shared radio frequency spectrum bandwidth, and receiving a second DMRS in a control resource block group of the one or more control resource block groups based at least in part on monitoring for downlink communications in the one or more control resource block groups, wherein the second DMRS is being scrambled based at least in part on a second DMRS scrambling sequence associated with a second shared radio frequency spectrum bandwidth associated with the control resource block group.

In a ninth aspect, alone or in combination with one or more of the first through eighth aspects, the first DMRS scrambling sequence is based at least in part on a cell identifier associated with a BS that transmitted the indication of the configuration for the CORESET, a timing of a transmission of the first DMRS, and a channel identifier associated with the first shared radio frequency spectrum bandwidth; and the second DMRS scrambling sequence is based at least in part on the cell identifier associated with the BS, a timing of a transmission of the second DMRS, and a channel identifier associated with the second shared radio frequency spectrum bandwidth. In a tenth aspect, alone or in combination with one or more of the first through ninth aspects, each of the one or more control resource block groups is configured by a respective control resource block group configuration for an associated shared radio frequency spectrum bandwidth.

In an eleventh aspect, alone or in combination with one or more of the first through tenth aspects, a starting resource block for a first control resource block group is located at a different location within an associated first shared radio frequency spectrum bandwidth relative to a location of a starting resource block for a second control resource block group within an associated second shared radio frequency spectrum bandwidth.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
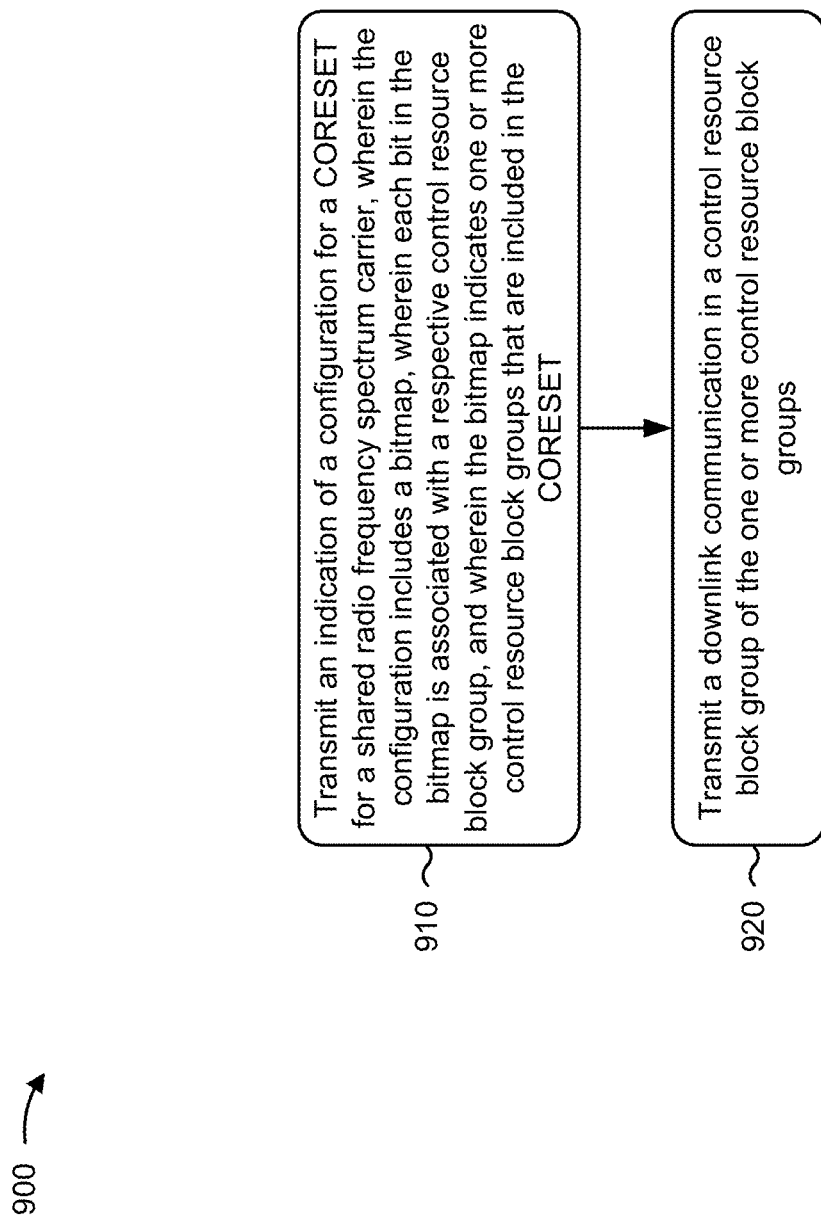
FIG. 9 is a diagram illustrating an example process performed, for example, by a BS, in accordance with various aspects of the present disclosure.

FIG. 9 is a diagram illustrating an example process 900 performed, for example, by a BS, in accordance with various aspects of the present disclosure. Example process 900 is an example where the BS (e.g., BS 110) performs operations associated with configuring a CORESET for a shared radio frequency spectrum carrier.

As shown in FIG. 9, in some aspects, process 900 may include transmitting an indication of a configuration for a CORESET for a shared radio frequency spectrum carrier, wherein the configuration includes a bitmap, wherein each bit in the bitmap is associated with a respective control resource block group, and wherein the bitmap indicates one or more control resource block groups that are included in the CORESET (block 910). For example, the BS (e.g., using transmit processor 220, receive processor 238, controller/processor 240, memory 242, and/or the like) may transmit an indication of a configuration for a CORESET for a shared radio frequency spectrum carrier, as described above. In some aspects, the configuration includes a bitmap. In some aspects, each bit in the bitmap is associated with a respective control resource block group. In some aspects, the bitmap indicates one or more control resource block groups that are included in the CORESET.

As further shown in FIG. 9, in some aspects, process 900 may include transmitting a downlink communication in a control resource block group of the one or more control resource block groups (block 920). For example, the BS (e.g., using transmit processor 220, receive processor 238, controller/processor 240, memory 242, and/or the like) may transmit a downlink communication in a control resource block group of the one or more control resource block groups, as described above.

Process 900 may include additional aspects, such as any single aspect or any combination of aspects described below and/or in connection with one or more other processes described elsewhere herein.

In a first aspect, the BS is configured with information identifying a number of resource blocks included in each of the one or more control resource block groups. In a second aspect, alone or in combination with the first aspect, the BS is configured with information identifying, for each of the control resource block groups a respective starting resource block within an associated shared radio frequency spectrum bandwidth and a respective ending resource block within the associated shared radio frequency spectrum bandwidth. In a third aspect, alone or in combination with one or more of the first and second aspects, the control resource block group is positioned off-center in an associated shared radio frequency spectrum bandwidth relative to a center frequency of the shared radio frequency spectrum bandwidth.

In a fourth aspect, alone or in combination with one or more of the first through third aspects, the indication of the configuration is included in at least one of an RRC communication, a MAC-CE communication, or a DCI communication. In a fifth aspect, alone or in combination with one or more of the first through fourth aspects, process 900 includes transmitting an SSB for a first shared radio frequency spectrum bandwidth; and performing the initial access procedure using an initial control resource block group in the first shared radio frequency spectrum bandwidth, wherein is performing the initial access procedure using the first control resource block group comprises: transmitting a PDCCH communication in the initial control resource block group during initial access procedure.

In a sixth aspect, alone or in combination with one or more of the first through fifth aspects, process 900 includes transmitting a first DMRS in the initial control resource block group, wherein the first DMRS is being scrambled based at least in part on a first DMRS scrambling sequence associated with the first shared radio frequency spectrum channel, and transmitting a second DMRS in the control resource block group, wherein the second DMRS is being scrambled based at least in part on a second DMRS scrambling sequence associated with a second shared radio frequency spectrum bandwidth associated with the control resource block group. In a seventh aspect, alone or in combination with one or more of the first through sixth aspects, the first DMRS scrambling sequence is based at least in part on a cell identifier associated with the BS, a timing of the transmission of the first DMRS, and a channel identifier associated with the first shared radio frequency spectrum bandwidth; and the second DMRS scrambling sequence is based at least in part on the cell identifier associated with the BS, a timing of the transmission of the second DMRS, and a channel identifier associated with the second shared radio frequency spectrum bandwidth.

In an eighth aspect, alone or in combination with one or more of the first through seventh aspects, each of the one or more control resource block groups is configured by a respective control resource block group configuration for an associated shared radio frequency spectrum bandwidth. In a ninth aspect, alone or in combination with one or more of the first through eighth aspects, a starting resource block for a first control resource block group is located at a different location within an associated first shared radio frequency spectrum bandwidth relative to a location of a starting resource block for a second control resource block group within an associated second shared radio frequency spectrum bandwidth.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising: receiving an indication of a configuration for a control resource set (CORESET) of a shared radio frequency spectrum carrier; identifying a bitmap included in the configuration, wherein each bit in the bitmap is associated with a respective shared radio frequency spectrum bandwidth and a respective control resource block set, wherein the respective control resource block set occupies the respective shared radio frequency spectrum bandwidth; identifying, based at least in part on a value for each bit in the bitmap, one or more control resource block sets that are included in the CORESET, wherein at least one of the one or more control resource block sets is identified based on a parameter used to identify a starting resource block for a control resource block set, within an associated shared radio frequency spectrum bandwidth, relative to a reference point of the associated shared radio frequency spectrum bandwidth; and monitoring for downlink communications in the one or more control resource block sets.

2. The method of claim 1, wherein the UE is configured with information identifying a number of resource blocks included in each respective control resource block set.

3. The method of claim 1, wherein the UE is configured with information identifying, for each respective control resource block set: a respective ending resource block within the respective shared radio frequency spectrum bandwidth.

4. The method of claim 1, wherein athe control resource block set of the one or more control resource block sets is positioned off-center in the associated shared radio frequency spectrum bandwidth relative to a center frequency of the associated shared radio frequency spectrum bandwidth.

5. The method of claim 1, wherein the indication of the configuration is included in at least one of: a radio resource control (RRC) communication,
  a medium access control control element (MAC-CE) communication, or
  a downlink control information (DCI) communication.

6. The method of claim 1, further comprising:
  receiving a physical downlink control channel (PDCCH) communication in the CORESET based at least in part on monitoring for downlink communications in the one or more control resource block sets.

7. The method of claim 1, further comprising: identifying a synchronization signal block (SSB) transmitted for a first shared radio frequency spectrum bandwidth of the shared radio frequency spectrum carrier; identifying an initial control resource block set associated with the first shared radio frequency spectrum bandwidth; performing an initial access procedure using the initial control resource block set; and receiving, based at least in part on the initial access procedure, the indication of the configuration for the CORESET.

8. The method of claim 7, wherein performing the initial access procedure using the initial control resource block set comprises: receiving a physical downlink control channel (PDCCH) communication in the initial control resource block set during initial access procedure.

9. The method of claim 7, further comprising:
  receiving a first demodulation reference signal (DMRS) in the initial control resource block set, wherein the first DMRS is scrambled based at least in part on a first DMRS scrambling sequence associated with an initial shared radio frequency spectrum bandwidth; and
  receiving a second DMRS in a second control resource block set of the one or more control resource block sets based at least in part on monitoring for downlink communications in the one or more control resource block sets,
  wherein the second DMRS is scrambled based at least in part on a second DMRS scrambling sequence associated with another shared radio frequency spectrum bandwidth associated with the second control resource block set.

10. The method of claim 9, wherein the first DMRS scrambling sequence is based at least in part on: a cell identifier associated with a base station (BS) that transmitted the indication of the configuration for the CORESET, a timing of a transmission of the first DMRS, and a channel identifier associated with the initial shared radio frequency spectrum bandwidth; and wherein the second DMRS scrambling sequence is based at least in part on: the cell identifier associated with the BS, a timing of a transmission of the second DMRS, and a channel identifier associated with the other shared radio frequency spectrum bandwidth.

11. The method of claim 1, wherein each of the one or more control resource block sets is configured by a respective control resource block set configuration for an associated shared radio frequency spectrum bandwidth.

12. The method of claim 1, wherein a first starting resource block for a first control resource block set is located at a different location within an associated first shared radio frequency spectrum bandwidth relative to a location of a second starting resource block for a second control resource block set within an associated second shared radio frequency spectrum bandwidth.

13. A method of wireless communication performed by a base station (BS), comprising: transmitting an indication of a configuration for a control resource set (CORESET) for a shared radio frequency spectrum carrier, wherein the configuration includes a bitmap, wherein each bit in the bitmap is associated with a respective shared radio frequency spectrum bandwidth and a respective control resource block set, wherein the respective control resource block set occupies the respective shared radio frequency spectrum bandwidth, wherein the bitmap indicates one or more control resource block sets that are included in the CORESET, and wherein at least one of the one or more control resource block sets is identified based on a parameter used to identify a starting resource block for a control resource block set, within an associated shared radio frequency spectrum bandwidth, relative to a reference point of the associated shared radio frequency spectrum bandwidth; and
    transmitting a downlink communication in at least one control resource block set of the one or more control resource block sets.

14. The method of claim 13, wherein the BS is configured with information identifying a number of resource blocks included in each of the one or more control resource block sets.

15. The method of claim 13, wherein the BS is configured with information identifying, for each of the control resource block sets: a respective ending resource block within the respective shared radio frequency spectrum bandwidth.

16. The method of claim 13, wherein the control resource block set is positioned off-center in an associated shared radio frequency spectrum bandwidth relative to a center frequency of the associated shared radio frequency spectrum bandwidth.

17. The method of claim 13, wherein the indication of the configuration is included in at least one of: a radio resource control (RRC) communication,
    a medium access control control element (MAC-CE) communication, or
    a downlink control information (DCI) communication.

18. The method of claim 13, further comprising:
    transmitting a synchronization signal block (SSB) for a first shared radio frequency spectrum bandwidth; and
        performing an initial access procedure using an initial control resource block set in the first shared radio frequency spectrum bandwidth,
    wherein performing the initial access procedure using the first control resource block set comprises: transmitting a physical downlink control channel (PDCCH) communication in the initial control resource block set during initial access procedure.

19. The method of claim 18, further comprising: transmitting a first demodulation reference signal (DMRS) in the initial control resource block set, wherein the first DMRS is scrambled based at least in part on a first DMRS scrambling sequence associated with the first shared radio frequency spectrum bandwidth, and transmitting a second DMRS in the control resource block set,
    wherein the second DMRS is scrambled based at least in part on a second DMRS scrambling sequence associated with a second shared radio frequency spectrum bandwidth associated with the control resource block set.

20. The method of claim 19, wherein the first DMRS scrambling sequence is based at least in part on: a cell identifier associated with the BS, a timing of the transmission of the first DMRS, and a channel identifier associated with the first shared radio frequency spectrum bandwidth; and wherein the second DMRS scrambling sequence is based at least in part on: the cell identifier associated with the BS, a timing of the transmission of the second DMRS, and a channel identifier associated with the second shared radio frequency spectrum bandwidth.

21. The method of claim 13, wherein each of the one or more control resource block sets is configured by a respective control resource block set configuration for an associated shared radio frequency spectrum bandwidth.

22. The method of claim 13, wherein a first starting resource block for a first control resource block set is located at a different location within an associated first shared radio frequency spectrum bandwidth relative to a location of a second starting resource block for a second control resource block set within an associated second shared radio frequency spectrum bandwidth.

23. A user equipment (UE) for wireless communication, comprising: a memory; and one or more processors, coupled to the memory, to:
    receive an indication of a configuration for a control resource set (CORESET) of a shared radio frequency spectrum carrier; identify a bitmap included in the configuration, wherein each bit in the bitmap is associated with a respective shared radio frequency spectrum bandwidth and a respective control resource block set,
    wherein the respective control resource block set occupies the respective shared radio frequency spectrum bandwidth; identify, based at least in part on a value for each bit in the bitmap, one or more control resource block sets that are included in the CORESET, wherein at least one of the one or more control resource block sets is identified based on a parameter used to identify a starting resource block for a control resource block set, within an associated shared radio frequency spectrum bandwidth, relative to a reference point of the associated shared radio frequency spectrum bandwidth; and
    monitor for downlink communications in the one or more control resource block sets.

24. The UE of claim 23, wherein the control resource block set of the one or more control resource block sets is positioned off-center in the associated shared radio frequency spectrum bandwidth relative to a center frequency of the associated shared radio frequency spectrum bandwidth.

25. The UE of claim 23, wherein each of the one or more control resource block sets is configured by a respective control resource block set configuration for an associated shared radio frequency spectrum bandwidth.

26. The UE of claim 23, wherein a first starting resource block for a first control resource block set is located at a different location within an associated first shared radio frequency spectrum bandwidth relative to a location of a second starting resource block for a second control resource block set within an associated second shared radio frequency spectrum bandwidth.

27. A base station (BS) for wireless communication, comprising: a memory; and one or more processors, coupled to the memory, to:

transmit an indication of a configuration for a control resource set (CORESET) for a shared radio frequency spectrum carrier, wherein the configuration includes a bitmap, wherein each bit in the bitmap is associated with a respective shared radio frequency spectrum bandwidth and a respective control resource block set, wherein the respective control resource block set occupies the respective shared radio frequency spectrum bandwidth, wherein the bitmap indicates one or more control resource block sets that are included in the CORESET, and wherein at least one of the one or more control resource block sets is identified based on a parameter used to identify a starting resource block for a control resource block set, within an associated shared radio frequency spectrum bandwidth, relative to a reference point of the associated shared radio frequency spectrum bandwidth; and transmit a downlink communication in at least one control resource block set of the one or more control resource block sets.

28. The BS of claim 27, wherein the control resource block set of the one or more control resource block sets is positioned off-center in an the associated shared radio frequency spectrum bandwidth relative to a center frequency of the associated shared radio frequency spectrum bandwidth.

29. The BS of claim 27, wherein each of the one or more control resource block sets is configured by a respective control resource block set configuration for an associated shared radio frequency spectrum bandwidth.

30. The BS of claim 27, wherein a first starting resource block for a first control resource block set is located at a different location within an associated first shared radio frequency spectrum bandwidth relative to a location of a second starting resource block for a second control resource block set within an associated second shared radio frequency spectrum bandwidth.

* * * * *